(12) United States Patent
Kim et al.

(10) Patent No.: US 11,675,928 B2
(45) Date of Patent: Jun. 13, 2023

(54) ELECTRONIC DEVICE FOR OBFUSCATING AND DECODING DATA AND METHOD FOR CONTROLLING SAME

(71) Applicant: SAMSUNG ELECTRONICS CO., LTD., Suwon-si (KR)

(72) Inventors: Sungwook Kim, Suwon-si (KR); Hyejin Shin, Suwon-si (KR); Soohyung Kim, Suwon-si (KR); Chunghun Baek, Suwon-si (KR); Junbum Shin, Suwon-si (KR); Youngeun Lee, Suwon-si (KR); Kyungsun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 16/771,359

(22) PCT Filed: Jan. 4, 2019

(86) PCT No.: PCT/KR2019/000141
§ 371 (c)(1),
(2) Date: Jun. 10, 2020

(87) PCT Pub. No.: WO2019/135631
PCT Pub. Date: Jul. 11, 2019

(65) Prior Publication Data
US 2020/0311306 A1  Oct. 1, 2020

(30) Foreign Application Priority Data

Jan. 5, 2018 (KR) .................. KR10-2018-0001776

(51) Int. Cl.
*G06F 21/62* (2013.01)
*G06F 21/16* (2013.01)
(Continued)

(52) U.S. Cl.
CPC .......... *G06F 21/6254* (2013.01); *G06F 21/16* (2013.01); *G06F 21/602* (2013.01); *G06F 21/64* (2013.01); *G06T 1/0028* (2013.01)

(58) Field of Classification Search
CPC .... G06F 21/6254; G06F 21/16; G06F 21/602; G06F 21/64; G06F 2221/0748;
(Continued)

(56) References Cited

U.S. PATENT DOCUMENTS 7,512,985 B1  3/2009  Grabarnik et al.
8,010,541 B2  8/2011  Aggarwal et al.
(Continued)

FOREIGN PATENT DOCUMENTS

CN  106096439  11/2016
CN  107430671  12/2017
(Continued)

OTHER PUBLICATIONS

Extended Search Report dated Dec. 8, 2020 in counterpart European Patent Application No. 19736024.1.
(Continued)

*Primary Examiner* — Carl G Colin
*Assistant Examiner* — Andrew Suh
(74) *Attorney, Agent, or Firm* — Nixon & Vanderhye, P.C.

(57) ABSTRACT

Disclosed are an electronic device for obfuscating user data and a server for decoding the same. A method for controlling an electronic device according to the present disclosure comprises the steps of: acquiring a security parameter according to data transmitted to an external server; applying an obfuscation algorithm to the data by using the security parameter; and transmitting the data, to which the obfuscation algorithm has been applied, to the external server. Furthermore, in connection with a method for controlling a
(Continued)

(57) ABSTRACT (continued)

system comprising an electronic device for obfuscating data and a server for decoding the same according to the present disclosure, a method for controlling the electronic device comprises the steps of: inserting a fingerprint into data; generating multiple pieces of split data having a preset first size on the basis of the data into which the fingerprint has been inserted; applying an obfuscation algorithm to one piece of split data selected from the multiple pieces of split data by using a preset security parameter; and transmitting the split data, to which the obfuscation algorithm has been applied, to the server. In addition, a method for controlling the server comprises the steps of: receiving the multiple pieces of split data, to which the obfuscation algorithm has been applied, from the electronic device; acquiring at least one piece of candidate data on the basis of the received multiple pieces of split data, to which the obfuscation algorithm has been applied; and acquiring data comprising the fingerprint among the at least one piece of candidate data.

17 Claims, 22 Drawing Sheets

(51) Int. Cl.
  *G06F 21/60* (2013.01)
  *G06F 21/64* (2013.01)
  *G06T 1/00* (2006.01)

(58) Field of Classification Search
  CPC . G06F 21/6245; G06F 21/629; G06T 1/0028; G06T 1/0021; G06N 3/084; G09C 5/00; H04L 2209/16; H04L 2209/42
  See application file for complete search history.

(56) References Cited

U.S. PATENT DOCUMENTS

| | | | |
|---|---|---|---|
| 9,536,098 B2* | 1/2017 | Jadeja | H04L 63/0428 |
| 9,536,528 B2 | 1/2017 | Rubin et al. | |
| 9,594,741 B1 | 3/2017 | Thakurta et al. | |
| 9,645,998 B1 | 5/2017 | Thakurta et al. | |
| 10,133,865 B1* | 11/2018 | Feinman | G06F 21/56 |
| 11,003,594 B2 | 5/2021 | Aschauer et al. | |
| 2006/0285684 A1 | 12/2006 | Rogaway | |
| 2012/0066769 A1* | 3/2012 | Latchem | G06F 21/10 726/26 |
| 2014/0237614 A1 | 8/2014 | Irvine | |
| 2015/0278545 A1* | 10/2015 | Bigras | G06F 21/44 726/26 |
| 2016/0119133 A1 | 4/2016 | Ciet et al. | |
| 2016/0173276 A1* | 6/2016 | Minematsu | G09C 1/00 380/28 |
| 2016/0180078 A1* | 6/2016 | Chhabra | G06F 21/57 726/19 |
| 2016/0180097 A1* | 6/2016 | Estehghari | H04L 9/0866 713/189 |
| 2016/0335441 A1 | 11/2016 | Aissi et al. | |
| 2016/0342608 A1 | 11/2016 | Burshteyn | |
| 2017/0063827 A1* | 3/2017 | Ricardo | H04L 63/083 |
| 2018/0081825 A1 | 3/2018 | Aschauer et al. | |
| 2020/0012770 A1* | 1/2020 | Turgeman | G06F 21/6245 |
| 2020/0218456 A1* | 7/2020 | Zeng | G06N 3/08 |
| 2021/0142206 A1* | 5/2021 | Ghanea-Hercock | G06F 21/602 |

FOREIGN PATENT DOCUMENTS

| | | |
|---|---|---|
| CN | 111343204 | 6/2020 |
| EP | 1 569 411 | 8/2005 |
| JP | 2005-190389 | 7/2005 |
| JP | 5646792 | 12/2014 |
| KR | 10-1355284 | 1/2014 |
| KR | 10-1707602 | 2/2017 |

OTHER PUBLICATIONS

Giulia Fanti, et al., "Building a RAPPOR with the Unknown: Privacy-Preserving Learning of Associations and Data Dictionaries", Proceedings on Privacy Enhancing Technologies, 2016, vol. 3, pp. 41-61.
International Search Report for PCT/KR2019/000141 dated Apr. 11, 2019, 5 pages with English Translation.
Written Opinion of the ISA for PCT/KR2019/000141 dated Apr. 11, 2019, 9 pages with English Translation.
Votice of Preliminary Rejection dated Nov. 8, 2021 in KR Patent Application No. 10-2018-0001776 and English-language translation.
Office Action dated Feb. 15, 2023 in Chinese Patent Application No. 201980007398.2 and English-language translation.
Communication dated Mar. 3, 2023 in European Patent Application No. 19736024.1.

\* cited by examiner

ELECTRONIC DEVICE FOR OBFUSCATING AND DECODING DATA AND METHOD FOR CONTROLLING SAME

This application is the U.S. national phase of International Application No. PCT/KR2019/000141 filed Jan. 4, 2019 which designated the U.S. and claims priority to KR Patent Application No. 10-2018-0001776 filed Jan. 5, 2018, the entire contents of each of which are hereby incorporated by reference.

FIELD

The disclosure relates to an electronic device for obfuscating and decoding data and a method for controlling the same, and more particularly, to a method for obfuscating data transmitted to a server to protect a privacy of a user, and collecting, by the server, the obfuscated data received from an electronic device to decode the collected data to original data.

The disclosure also relates to an artificial intelligence (AI) system simulating a recognition function, a decision function and the like of a human's brain using a machine learning algorithm such as deep learning or the like, and an application thereof.

DESCRIPTION OF RELATED ART

An artificial intelligence (AI) system is a computer system that implements human-level intelligence, and a system that a machine itself learns, judges, and becomes smart, unlike an existing rule-based smart system. As the artificial intelligence system is more used, a recognition rate is improved and a user's taste may be more accurately understood. Therefore, the existing rule-based smart system has been gradually replaced by a deep learning-based artificial intelligence system.

An artificial intelligence technology includes machine learning (deep learning) and element technologies using the machine learning.

The machine learning is an algorithm technology of classifying and learning features of input data by oneself, and the element technology is a technology of using a machine learning algorithm such as deep learning, or the like, and includes technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of determining and logically inferring and predicting information, and includes knowledge/probability-based inference, optimization prediction, preference-based planning, recommendation, and the like. The knowledge representation is a technology of automating and processing human experience information as knowledge data, and includes knowledge establishment (data generation/classification), knowledge management (data utilization), and the like. The motion control is a technology of controlling autonomous driving of a vehicle, a motion of a robot, and the like, and includes a motion control (navigation, collision, driving), an operation control (behavior control), and the like.

Meanwhile, various methods for collecting and managing various data have been proposed in recent years. As a technique for collecting various data and applying the collected data, for example, when a user inputs a word on a smart phone, there is a technique for analyzing the word to input, recommending a word to be input by the user, or correcting a misspelling. The technique may collect various word data through various methods (SNS server, a plurality of user input words, portal search word, etc.).

At this time, various collected data may include various data such as a search word input by a user into a search engine, history information about a website visited by the user, and a text message. At this time, the various collected data may have the degree of required security that varies depending on the type thereof. For example, it is irrelevant that search word data input by the user to the search engine has low security, but text message data including sensitive information such as the user's social security number and account number needs to have high security. At this time, when data that needs to have high security is collected in an unsecured state, a serious problem related to a leakage of personal information may be caused.

In order to solve the problem described above, there is a method of inserting noise into data collected by a user terminal and obfuscating the data, as the related art. However, data restored after obfuscation may vary depending on the noise inserted during the obfuscation process.

In addition, as described above, the collected data may differ in importance and accuracy required for the restored data depending on the type thereof. Specifically, there is a case where the importance of data in the user terminal greatly varies depending on an application or the type of data collected by the application. For example, in the case of health-related data, if the accuracy is reduced due to noise, it may cause a serious danger to the user. However, conventional technologies for securing personal information and transmitting data have not been able to efficiently use resources by applying the same obfuscation method in a batch without grasping the security and accuracy required for the data to be collected, and accordingly, there was a problem in that unnecessary calculation amount was increased.

Therefore, there is a need for a method capable of efficiently collecting various data generated/modified/provided by the user, while protecting the user's personal information.

SUMMARY

The disclosure provides an electronic device, a server, and a system including the electronic device and the server that may protect user's personal information by obfuscating and decoding user data, and a method for controlling the same.

According to an embodiment of the disclosure, a control method of an electronic device for obfuscating user data includes: acquiring a security parameter according to data to be transmitted to an external server; applying an obfuscation algorithm to the data using the security parameter; and transmitting the data to which the obfuscation algorithm is applied to the external server.

The acquiring of the security parameter may further include: determining an application in which the data is generated; and acquiring the security parameter based on an importance of the data and an importance of the determined application.

The acquiring of the security parameter may further include determining the importance of the application using at least one of a category of the determined application, a name of the application, data generated by the application, or a source code for driving the application.

The acquiring of the security parameter may further include determining the importance of the application by inputting at least one of a category of the determined application, a name of the application, data generated by the application, or a source code for driving the application to an artificial intelligence learning model as input data.

The applying of the obfuscation algorithm may includes: inserting a finger print into the data; generating a plurality of divided data having a predetermined first size based on the data into which the finger print is inserted; and applying the obfuscation algorithm to selected one of the plurality of divided data using the security parameter, and in the transmitting of the data, the selected one divided data to which the obfuscation algorithm is applied may be transmitted.

In the inserting of the finger print, the data may be padded according to a predetermined second size based on the data having a size smaller than the predetermined second size, and the finger print may be inserted into the padded data, and the data may be truncated according to the predetermined second size based on the data having a size smaller than the predetermined second size, and the finger print may be inserted into the truncated data.

The generating of the divided data may further include inserting an index from 0 to N−1 into each of the plurality of divided data based on the number of the plurality of divided data, which is N, and divided data adjacent to each other among the plurality of divided data may include duplicate data having a predetermined third size.

N-th divided data and first divided data may include the duplicate data having the predetermined third size, based on a first divided data of the data, which is the first divided data into which the index of 0 is inserted, and the last divided data of the data, which is the N-th divided data into which the index of N−1 is inserted.

The inserting of the finger print may further include re-sorting the data into which the finger print is inserted using a predetermined permutation matrix.

According to another embodiment of the disclosure, an electronic device for obfuscating user data includes: a communicator; a memory configured to include at least one instruction; and a processor configured to be connected to the communicator and the memory to control the electronic device, wherein the processor is configured to, by executing at least one instruction, acquire a security parameter according to data transmitted to an external server and apply an obfuscation algorithm to the data using the security parameter, and control the communicator to transmit the data to which the obfuscation algorithm is applied to the external server.

The processor may be configured to determine an application in which the data is generated; and acquire the security parameter based on an importance of the data and an importance of the determined application.

The processor may be configured to determine the importance of the application using at least one of a category of the determined application, a name of the application, data generated by the application, or a source code for driving the application.

The processor may be configured to determine the importance of the application by inputting at least one of a category of the determined application, a name of the application, data generated by the application, or a source code for driving the application to an artificial intelligence learning model as input data.

The processor may be configured to control the communicator to: insert a finger print into the data; generate a plurality of divided data having a predetermined first size based on the data into which the finger print is inserted; apply the obfuscation algorithm to selected one of the plurality of divided data using the security parameter; and transmit the selected on divided data to which the obfuscation algorithm is applied.

The processor may be configured to pad the data according to a predetermined second size based on the data having a size smaller than the predetermined second size and insert the finger print the padded data, and truncate the data according to the predetermined second size based on the data having a size smaller than the predetermined second size and insert the finger print into the truncated data.

The processor may be configured to insert an index from 0 to N−1 into each of the plurality of divided data based on the number of the plurality of divided data, which is N, and divided data adjacent to each other among the plurality of divided data may include duplicate data having a predetermined third size.

N-th divided data and first divided data may include the duplicate data having the predetermined third size, based on a first divided data of the data, which is the first divided data into which the index of 0 is inserted, and the last divided data of the data, which is the N-th divided data into which the index of N−1 is inserted.

The processor may be configured to re-sort the data into which the finger print is inserted using a predetermined permutation matrix.

According to another embodiment of the disclosure, a control method of a system including an electronic device for obfuscating user data and a server for decoding obfuscated data is provided, wherein the control method of the electronic device includes: inserting a finger print into data; generating a plurality of divided data having a predetermined first size based on the data into which the finger print is inserted; applying an obfuscation algorithm to selected one of the plurality of divided data using a predetermined security parameter; and transmitting the divided data to which the obfuscation algorithm is applied to the server, and the control method of the server includes: receiving a plurality of divided data to which the obfuscation algorithm is applied from the electronic device; acquiring at least one candidate data based on the plurality of received divided data to which the obfuscation algorithm is applied; and acquiring data including the finger print among at least one candidate data.

in the inserting of the finger print, the data may be padded according to a predetermined second size based on the data having a size smaller than the predetermined second size, and the finger print may be inserted into the padded data, and the data may be truncated according to the predetermined second size based on the data having a size smaller than the predetermined second size, and the finger print may be inserted into the truncated data.

The generating of the divided data may further include inserting an index from 0 to N−1 into each of the plurality of divided data based on the number of the plurality of divided data, which is N, and divided data adjacent to each other among the plurality of divided data may include duplicate data having a predetermined third size.

N-th divided data and first divided data may include the duplicate data having the predetermined third size, based on a first divided data of the data, which is the first divided data into which the index of 0 is inserted, and the last divided data of the data, which is the N-th divided data into which the index of N−1 is inserted.

The inserting of the finger print may further include re-sorting the data into which the finger print is inserted using a predetermined permutation matrix.

The control method may further include: sorting the received divided data for each index, based on the plurality of divided data to which the obfuscation algorithm is applied, received from the electronic device; and acquiring the divided data of a predetermined number or more among the sorted divided data, wherein in the acquiring of at least one candidate data, at least one candidate data is acquired based on the acquired divided data of the predetermined number or more.

The acquiring of at least one candidate data may include connecting adjacent divided data based on at least one adjacent divided data having divided duplicate data having the predetermined third size among the plurality of divided data sorted for each index, and the candidate data may be data in which all the divided data including the index of 0 and the divided data including the index of N−1 are connected.

The inserting of the finger print may include re-sorting the data into which the finger print is inserted using a predetermined permutation matrix, and the control method of the server may further include re-sorting the candidate data using an inverse matrix of the predetermined permutation matrix after acquiring the candidate data.

According to diverse embodiments of the disclosure as described above, the electronic device and the server may more efficiently obfuscate and decode the data. That is, the electronic device and the server may find an optimal security parameter for the data and learn more data from the same security parameter compared to the related art.

DETAILED DESCRIPTION OF EXAMPLE EMBODIMENTS

Figure 1A:
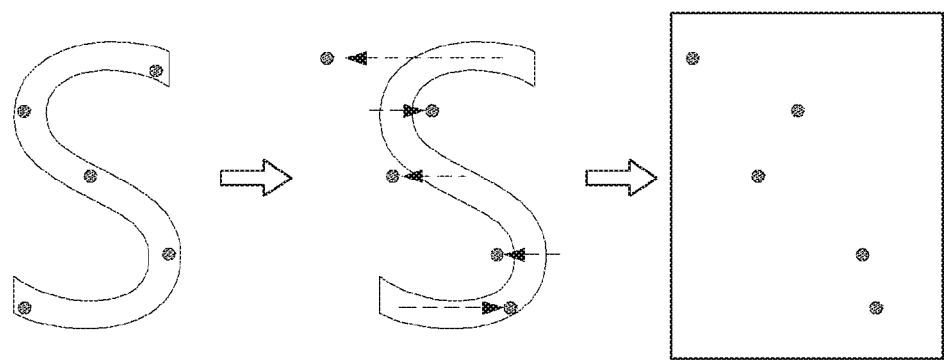
FIGS. 1A, 1B, 1C, 1D and 1E are illustrative diagrams for describing a method for obfuscating and decoding data.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, an emergence of a new technique, and the like. In addition, in certain cases, some terms are arbitrarily selected by the applicant, and in this case, meanings thereof will be described in detail in the corresponding description of the disclosure. Therefore, the terms used in the disclosure should be defined on the basis of the meaning of the terms and the contents throughout the disclosure rather than simple names of the terms.

Embodiments of the disclosure may apply various modifications and have various embodiments, and specific embodiments will be illustrated in the drawings and described in detail in the detail description. However, this is not intended to limit the scope to the specific embodiment, and it should be understood to include all modifications, equivalents, and substitutes included in the scope of the disclosed spirit and technology. In describing the embodiments, when it is determined that the detailed description of the related known technology may obscure the gist, the detailed description thereof will be omitted.

Terms such as first and second may be used to describe various components, but the components should not be limited by the terms. The terms are used only to distinguish one component from other components.

Singular expressions include plural expressions unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

In embodiments of the disclosure, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor (not illustrated) except for a 'module' or an '~er/or' that needs to be implemented by specific hardware.

In the embodiments of the disclosure, when any portion is referred to as being "connected" to another portion, this includes not only "directly connected" but also "electrically connected" while having another element interposed therebetween. In addition, when any portion "includes" any component, this means that other components may be further included rather than excluding other components, unless otherwise specified.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to the embodiments described herein. In addition, in the drawings, portions unrelated to the description will be omitted to obviously describe the disclosure, and similar portions will be denoted by similar reference numerals throughout the specification.

In addition, in the embodiments of the disclosure, an "application" refers to a set of computer programs designed to perform a specific task. In the embodiments of the disclosure, the application may vary. For example, examples of the application may include a game application, a video playback application, a map application, a memo application, a calendar application, a phone book application, a broadcast application, an exercise support application, a payment application, a photo folder application, a medical device control application, and a user interface providing application for multiple medical devices, but are not limited thereto.

In the specification, a processor may apply artificial intelligence technology to drive a software application that performs instructions desired by the user. For example, the processor may perform artificial intelligence functions such as machine learning including deep learning, speech recognition, sentence analysis, and situational awareness. The processor may provide a customized service required for an individual by learning a user's habit or pattern. A software application to which the artificial intelligence technology is applied may be, for example, S voice, Bixby, or the like.

Meanwhile, in the disclosure, a term "user" may be a person that uses the electronic device or a device (e.g., an artificial intelligence electronic device) that uses the electronic device.

Hereinafter, the concept of obfuscation and decoding according to the disclosure will be briefly described with reference to FIGS. 1A and 1B, and the improvement of the disclosure over the related art will be briefly described with reference to FIGS. 1C to 1E.

FIG. 1A is an illustrative diagram for conceptually describing obfuscation. For example, when a user inputs a letter "S", an electronic device may obfuscate S. The obfuscated S may be understood by a method of moving specific points of S to arbitrary positions, for example, as illustrated in FIG. 1A. The electronic device may generate a report for S based on the obfuscated S. The above description conceptually describes an obfuscation process according to the disclosure. Such a concept may be implemented through various methods.

For example, the method for obfuscating data may vary. As an example, when a machine language corresponding to S is expressed as {1110011}, the electronic device 100 may flip each digit of {1110011} with a predetermined probability. For example, the electronic device may flip a first digit with a probability of 60%, a second digit with a probability of 40%, a third digit with a probability of 70%, a fourth digit with a probability of 10%, a fifth digit with a probability of 90%, a sixth digit with a probability of 30%, and a seventh digit with a probability of 80%. S obfuscated according to the predetermined probability may be {0110111}, for example. The electronic device may generate a report for {1110011} based on the obfuscated {0110111}.

That is, the electronic device performs obfuscation with the same probability set for the same word, but the reports for the same word may be different.

A report may be generated by various methods for obfuscation in addition to the method described above. However, in the disclosure, a case in which obfuscation and decoding are performed through a differential privacy algorithm will be described as an example.

Meanwhile, the server may receive the obfuscated data from the electronic device. For example, when a plurality of electronic devices input and obfuscate "S" to generate reports for S and transmit the reports to the server, the server may determine that the letter S has been input based on a plurality of received reports.

Figure 1B:
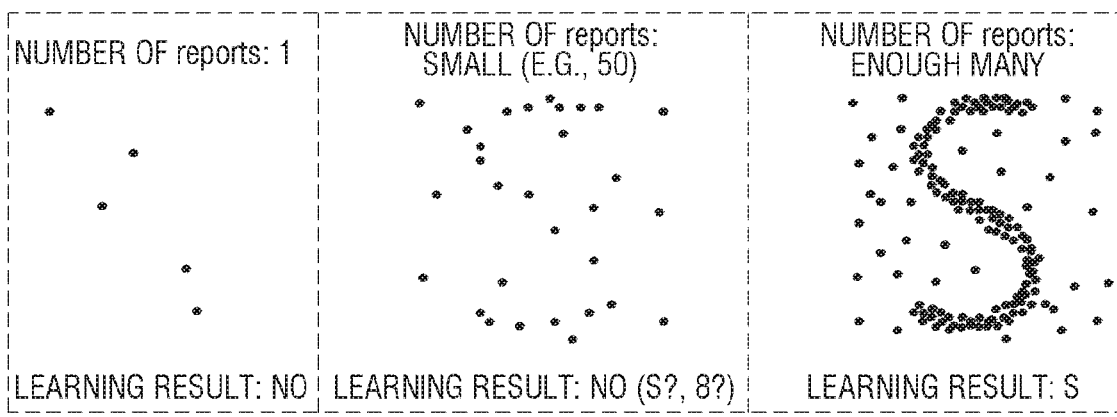

Specifically, as illustrated on the left side of FIG. 1B, when one obfuscated report is transmitted from any one of a plurality of electronic devices, the server may not find original data from an obfuscated record.

However, when a plurality of obfuscated reports are received from the plurality of electronic devices, and the received reports are a predetermined value or more, the server may acquire the original data by decoding the plurality of obfuscated reports.

That is, as illustrated in the center of the FIG. 1B, for example, when the number of collected reports is 50, the server may determine that the original data is S or 8, but the determined original data may not be accurate. However as illustrated on the right side of the FIG. 1B, for example, when the number of collected reports is 100,000, the server may determine that the original data is S.

Through the method as described above, the electronic device and the server may collect and determine data used by a plurality of users while protecting personal information.

Figure 1C:
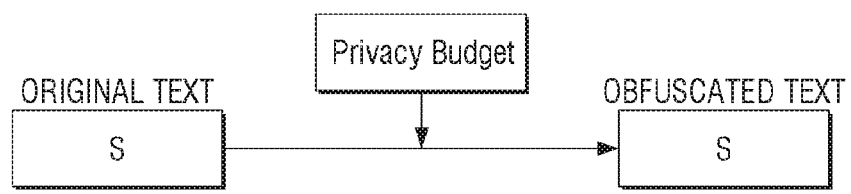

FIG. 1C is an illustrative diagram for describing a data security parameter according to an embodiment of the disclosure.

Specifically, the electronic device may obfuscate data using a security parameter (or referred to as Privacy Budget). At this time, the smaller the security parameter, the higher the security strength, and the smaller the security parameter, the lower the security strength. However, in the case in which the security parameter is small, as user's personal information is strongly protected, decoding may be difficult.

That is, in the case in which the security parameter is small, the user's personal information is strongly protected, but it may be difficult to acquire accurate original data because the calculation amount and throughput of the server performing the decoding increase. In conclusion, the user information protection and the accuracy of the decoded data are in a trade-off relationship, and accordingly, a method for optimizing between the user information protection and the accuracy of the decoded data is needed.

Figure 1D:
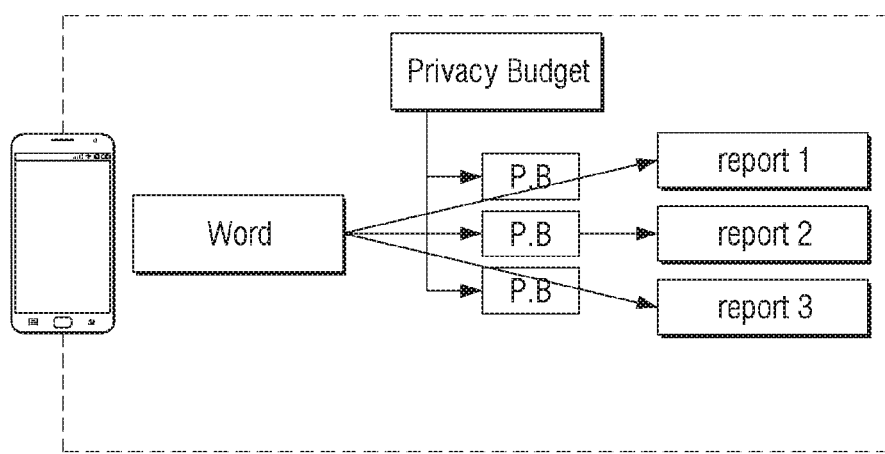
Figure 1D:
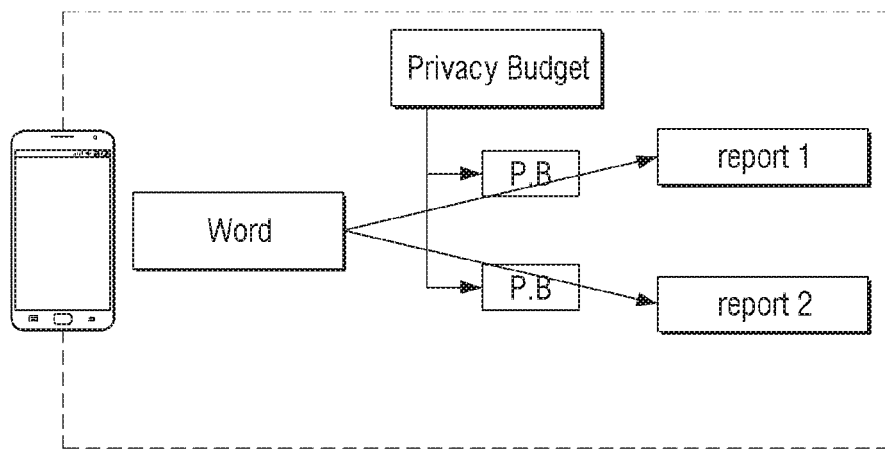

However, in the case of the related art, as illustrated in FIG. 1D, two or more reports are generated for one data, and the obfuscation and decoding for the data are performed. Specifically, for example, in the case of the related art, when the obfuscation is performed on a specific word, the electronic device generates an N-gram report and a hash-based word report for the word and transmits the generated reports to the server. The server uses a method of estimating the obfuscated word based on the N-gram report, acquiring a hash of the estimated word, and identifying the original word by comparing the acquired hash with a hash operation result in the word report. In the case of such a related art, because a limited security parameter value is divided and allocated to a plurality of reports, there was a problem in that the calculation amount of the server increases.

Figure 1E:
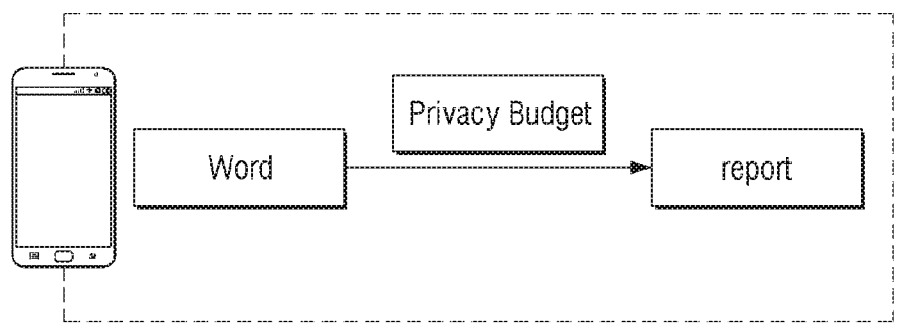

However, the electronic device according to the disclosure may generate one report for one data, as illustrated in FIG. 1E. That is, the electronic device may apply the security parameter to only one report by generating one integrated report, rather than generating a plurality of data for one data, and may increase the accuracy of obfuscation than the related art by applying the security parameter to only one report.

Hereinafter, a method of acquiring an importance security parameter (or privacy budget) of an application or data will be described with reference to FIGS. 2 to 7B, and a specific method for obfuscating and decoding data will be described with reference to FIGS. 8 and 9.

Figure 2:
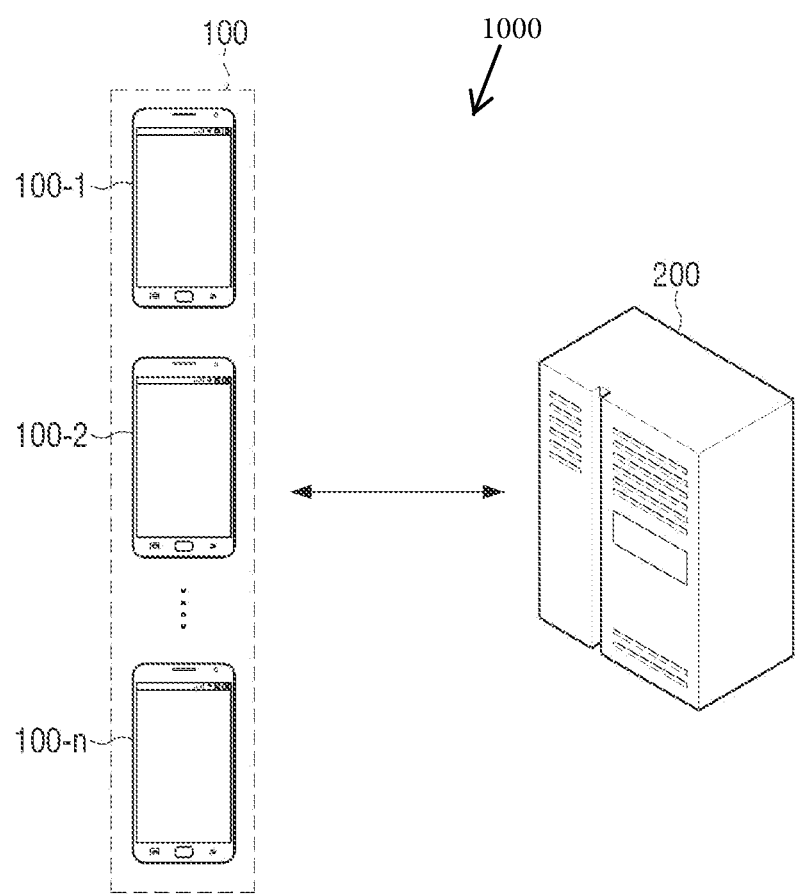
FIG. 2 is a system diagram for describing a system including an electronic device and a server according to an embodiment of the disclosure.

FIG. 2 is a system diagram for describing a system including an electronic device and a server according to an embodiment of the disclosure.

As illustrated in FIG. 2, a system 1000 may include an electronic device 100 and a server 200. The electronic device 100 is a configuration for transmitting various types of data to the server 200. The server 200 may receive various types of data from a plurality of electronic devices 100-1 to 100-n. At this time, the electronic device 100 may be implemented as a smartphone, but this is only an example, and the electronic device may include at least one of a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device. According to diverse embodiments, the wearable device may include at least one of an accessory type wearable device (e.g., a watch, a ring, a bracelet, an anklet, a necklace, glasses, a contact lens, or a head-mounted-device (HMD)), a textile or clothing integral type wearable device (e.g., an electronic clothing), a body attachment type wearable device (e.g., a skin pad or a tattoo), or a living body implantation type wearable device (e.g., an implantable circuit).

As another example, the electronic device 100 may be a home appliance. The home appliance may include at least one of, for example, a television, a digital video disk (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™, PlayStation™), an electronic dictionary, an electronic key, a camcorder, or an electronic frame.

As another example, the electronic device 100 may include at least one of various medical devices (e.g., various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, an automatic teller's machine of a financial institute, a point of sales (POS) of a shop, or Internet of things (IoT) devices (e.g., a light bulb, various sensors, an electric or gas meter, a sprinkler system, a fire alarm, a thermostat, a street light, a toaster, an exercise equipment, a hot water tank, a heater, a boiler, and the like).

As another example, the electronic device 100 may include at least one of a portion of a furniture or a building/structure, an electronic board, an electronic signature receiving device, a projector, or various meters (e.g., water, electricity, gas, electric wave meter, or the like).

The electronic device 100 may obfuscate data to be transmitted to the server 200. At this time, obfuscation refers to a process of transforming original data so that it does not know what the original data is.

The server 200 decodes the obfuscated data received from the plurality of electronic devices 100-1 to 100-n. As an example, decoding is not performed for each obfuscated data, but refers to a process of acquiring the original data using a plurality of obfuscated data.

The server 200 may decode the plurality of obfuscated data received from the plurality of electronic devices 100-1 to 100-n to acquire the original data generated by the plurality of electronic devices 100-1 to 100-n. For example, when the plurality of electronic devices 100-1 to 100-n generate and obfuscate the same (or similar) data by a predetermined number of times or more, and transmit the generated and obfuscated data to the server 200, the server 200 decodes the obfuscated data. When the decoding is completed, the server 200 may know what data is generated by the predetermined number of times or more, but does not know whether the data is transmitted from any one of the plurality of electronic devices 100-1 to 100-n. Through the method described above, the server 200 may know what data is transmitted to the server 200 by an arbitrary user (i.e., at least one of the plurality of electronic devices 100-1 to 100-n) in a situation where the user's personal information is unknown.

Hereinafter, in the disclosure, the functions of the plurality of electronic devices 100-1 to 100-n are the same, and therefore, except for a special case in which the electronic device 100 and the plurality of electronic devices 100-1 to 100-n need to be distinguished, it will be described based on the electronic device 100.

Figure 3A:
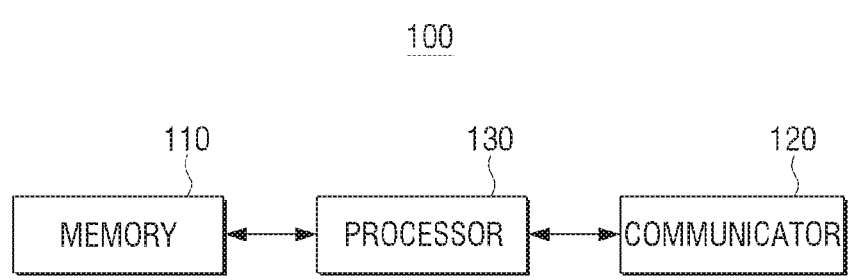
FIGS. 3A, 3B, 3C and 3D are block diagrams for describing a configuration of an electronic device according to an embodiment of the disclosure.

FIG. 3A is a block diagram briefly illustrating a configuration of an electronic device 100 according to an embodiment of the disclosure. As illustrated in FIG. 3A, the electronic device 100 may include a memory 110, a communicator 120, and a processor 130.

The memory 110 may store various programs and data required for an operation of the electronic device 100. The memory 110 may be implemented as a non-volatile memory, a volatile memory, a flash-memory, a hard disc drive (HDD), a solid state drive (SSD), or the like.

In particular, the memory 110 may store various application information and data. In addition, the memory 110 may store various instructions for performing necessary operations under the control of the processor 130.

The communicator 120 may communicate with the server 200. Specifically, the communicator 120 may transmit data obfuscated by the processor 130 to the server 200.

The processor 130 controls an overall operation of the electronic device 100. Specifically, the processor 130 may determine a security parameter according to data to be transmitted to the server 200. At this time, the security parameter may be determined according to importance of the data to be transmitted. Furthermore, the security parameter may also be determined according to the importance of an application generating the data to be transmitted as well as the data to be transmitted.

Specifically, the security parameter may be acquired in consideration of the importance of the data to be transmitted. For example, when the data to be transmitted is data that needs to be secured (e.g., the user's social security number, account number, password, etc.), the processor 130 may acquire the security parameter in consideration of the importance of data to be transmitted.

As another example, the security parameter may be acquired by various methods. As an example, the security parameter may be acquired by user manipulation. That is, the user may set the security parameter to be low for applications that are determined to be important in security, and may set the security parameter to be high for applications that are determined to be less important in security.

As another example, the security parameter may be determined by a predetermined criterion or a predetermined algorithm by the processor 130. For example, the processor 130 may determine importance of an application by using at least one of a category of an application, a name of the application, data generated by the application, a source code for driving the application, or other applications (e.g., a security application) executed together with the application, and acquire a security parameter for the application according to the importance of the application.

At this time, the security parameter may be determined using an artificial neural network model. For example, the processor 130 may learn an importance determination criterion for the application by inputting various application information described above (a category of an application, a name of the application, data generated by the application, a source code for driving the application, or other applications executed together with the application) and the data to be transmitted to an artificial intelligence learning model as learning data, and determine the importance of the application by inputting information of an specific application to the artificial intelligence learning model as input data when the specific application is executed.

The processor 130 may obfuscate the data by applying an obfuscation algorithm using the acquired security parameter to the data to be transmitted to an external server. Specifically, the processor 130 may generate one report by obfuscating data and control the communicator 120 to transmit the generated report to the server 200.

Meanwhile, the processor 130 may obfuscate the data by applying various methods. Specifically, the processor 130 may insert a finger print into the data and generate a plurality of divided data having a predetermined first size of the data into which the finger print is inserted. Next, the processor 130 may select any one of the divided data and obfuscate the selected divided data to generate a report for the data.

At this time, the finger print is used to determine whether the original data and the data decoded by the server 200 are the same. That is, the same finger print is inserted for the same data, and the server 200 may determine whether the decoded data is accurate data by determining whether the finger print of the decoded data and the transmitted finger print are the same.

At this time, the finger print may be generated using a hash function. The hash function is a function of mapping data of arbitrary length to fixed data, and needs to have preimage resistance, second preimage resistance, and collision resistance.

The preimage resistance refers to a characteristic in which it is difficult to find an input value generating a hash value for a given hash value. The second preimage resistance refers to a characteristic in which it is difficult to change an input without changing a hash value of the input for an input value. The collision resistance refers to a characteristic in which it is computationally difficult to find two input values that generate the same hash value. Meanwhile, the hash function includes, but is not limited to, MD5 and SHA-based hash functions.

That is, the finger print may be a hash value (output value) in which original data (exactly, data having a predetermined second size in which the original data is padded or truncated as described later) is applied to the hash function as the input value. Because the hash value for the same data is always the same, the server 200 may determine whether the decoded data is accurate data.

At this time, the processor 130 may pad the data according to the predetermined second size to insert the finger print into the padded data when the data is smaller than the predetermined second size, and truncate the data according to the predetermined second size to insert the finger print into the truncated data when the data is smaller than the predetermined second size. That is, the processor 130 may transmit only data of a certain size to the server 200. This is to compensate for a disadvantage that the decoding process of the server 200 is complicated and the calculation amount increases when the processor 130 transmits data of different sizes. At this time, when the data is padded, the server 200 may restore the original data as it is. However, when the data is truncated, the server 200 may not restore the original data as it is, and may restore the truncated data. However, the server 200 may infer the original data from the truncated data through various methods (e.g., by using an artificial intelligence model or by inferring the acquired (truncated) data).

Meanwhile, when the number of the plurality of divided data is N, the processor 130 may insert an index into each of the plurality of divided data. For example, the processor 130 may insert indexes from 0 to N−1 into N divided data.

At this time, the divided data having indexes adjacent to each other may be divided data adjacent to each other. In addition, the divided data adjacent to each other may include duplicate data of a predetermined third size.

At this time, when a first divided data into which an index of 0 is inserted is a first divided data of the data, and an N-th divided data into which an index of N−1 is inserted is the last divided data of the data, the first divided data is data at the front of the data and the N-th data is the last portion of the data, and therefore, it may be a problem what duplicate data of the predetermined third size is. In this case, the last portion of the N-th data may be duplicated with the data of the first portion of the first data. However, the duplication is not limited thereto, and the first portion of the first data and the last portion of the N-th data may also be duplicated. That is, as the data is divided by the method described above, each divided data has connection consistency and continuity.

Figure 3B:
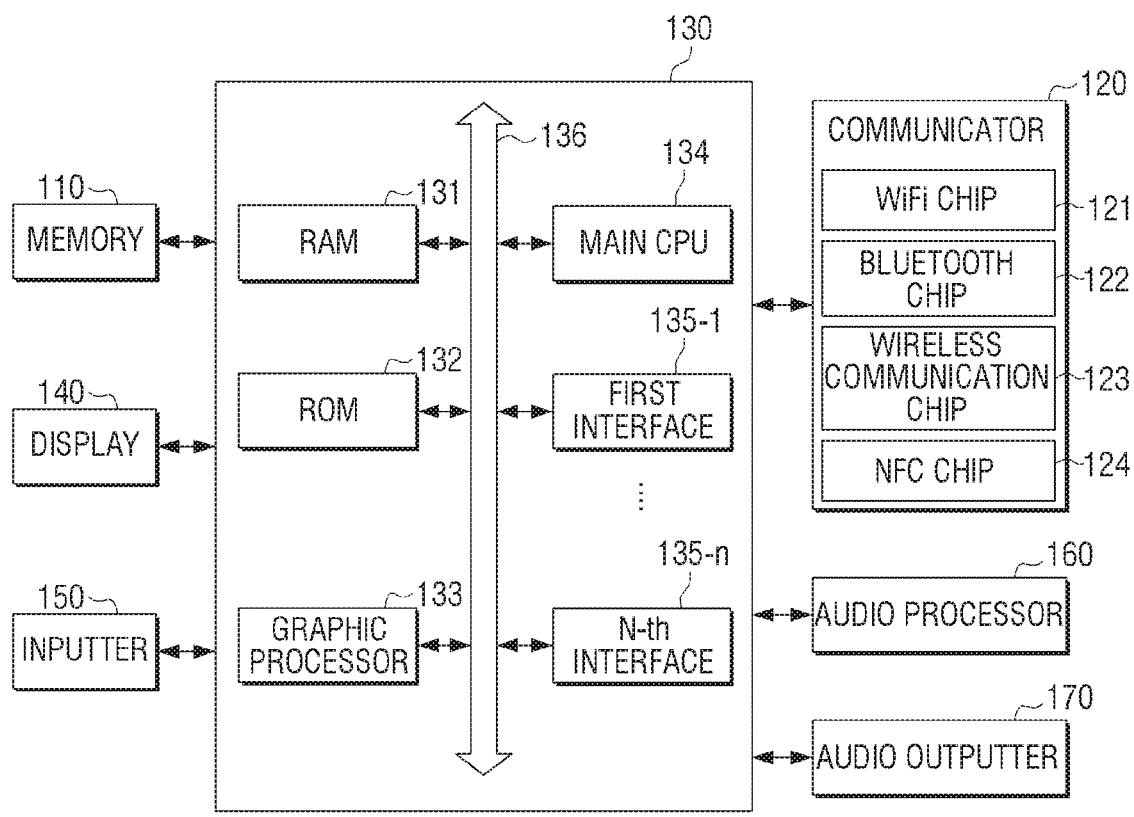
Figure 3C:
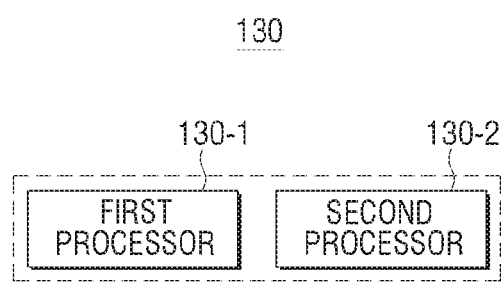
Figure 3D:
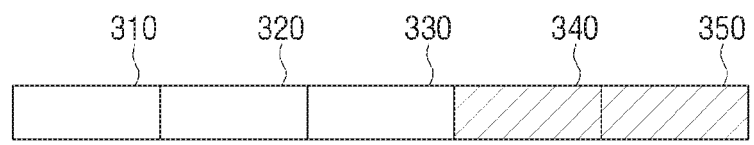

For convenience of description, it will be described on the assumption that data is divided into five blocks, as illustrated in FIG. 3D. At this time, the predetermined second size may be a size including a first block 310 to a fifth block 350. The processor 130 may pad or truncate the data according to sizes of the five blocks. At this time, when the finger print occupies two blocks, the processor 130 may substantially pad or truncate the data according to sizes of three blocks. The processor 130 may insert the finger prints into the fourth block 340 and the fifth block 350. A position where the finger print is inserted and a size of the finger print may always be the same.

On the other hand, assuming the case of dividing the data illustrated in FIG. 3D into 5, a first divided data having an index of 0 may include the first block 310 and the second block 320, a second divided data having an index of 1 may include the second block 320 and the third block 330, a third divided data having an index of 2 may include the third block 330 and the fourth block 340, a fourth divided data having an index of 3 may include the fourth block 340 and the fifth block 350, and a fifth divided data having an index of 4 may include the fifth block 350 and the first block 310.

Meanwhile, in order to improve security, the processor 130 may re-sort the data in which the finger print is inserted using a predetermined permutation matrix.

In conclusion, the processor 130 may generate one report by processing the data according to the predetermined first size, inserting the finger print, re-sorting the data in which the finger print is inserted using the predetermined permutation matrix, dividing the re-sorted data into a plurality of divided data, inserting the indices into the plurality of divided data, and obfuscating any one divided data.

Meanwhile, the server 200 may receive an obfuscated report from the electronic device 100. When reports for the plurality of divided data are received from the plurality of electronic devices 100-1 to 100-n, the server 200 may decode the plurality of received reports and acquire at least one candidate data. At this time, the candidate data may refer to various data generated using the received reports.

The server 200 may acquire the original data received from the plurality of electronic devices 100-1 to 100-n using a finger print of candidate data. Specifically, the server 200 separates the data and the finger prints from the candidate data, and determines whether a hash value (finger print) for the separated data and the separated finger print are the same. When the hash value (finger print) for the separated data and the separated finger print are the same, the separated data may be data received from a plurality of electronic devices 100-1 to 100-n, and when the hash value (finger print) for the separated data and the separated finger print are not the same, the separated data may be erroneous data.

Specifically, when the server 200 receives a plurality of obfuscated reports from the electronic device 100, the server 200 may sort the plurality of reports for each index using index information included in the report. At this time, the server 200 may acquire the same divided data of a predetermined number or more among the sorted reports.

When the reports are sorted for each index, the server 200 may determine whether duplicate data of a predetermined third size included in adjacent reports are the same. The server 200 may acquire the candidate data by connecting the reports having the same duplicate data of the predetermined third size.

On the other hand, when the electronic device 100 re-sorts the data in which the finger print is inserted using the predetermined permutation matrix, the server 200 may sort the candidate data by using an inverse matrix of the acquired predetermined permutation matrix.

FIG. 3B is a block diagram for describing in detail a configuration of an electronic device according to an embodiment of the disclosure.

As illustrated in FIG. 3B, the electronic device 100 may further include a display 140, an inputter 150, an audio processor 160, and an audio outputter 170, in addition to the memory 110, the communicator 120, and the processor 130.

The memory 110 may store various programs and data required for the operation of the electronic device 100, as described above. At this time, the memory 110 may include a hard disk, memory, a cache, and a register. In addition, in the disclosure, the memory may include a read only memory (ROM) and a random access memory (RAM) inside the processor 130.

The communicator 120 may communicate with an external device. In particular, the communicator 120 may include various communication chips such as a wireless fidelity (WiFi) chip 121, a Bluetooth chip 122, a wireless communication chip 123, and a near field communication (NFC) chip 124. At this time, the WiFi chip 121, the Bluetooth chip 122, and the NFC chip 124 perform communication in a LAN scheme, a WiFi scheme, a Bluetooth scheme, an NFC scheme, respectively. In the case of using the WiFi chip 121 or the Bluetooth chip 122, various kinds of connection information such as a service set identifier (SSID), a session key, and the like, are first transmitted and received, communication is connected using the connection information, and various kinds of information may then be transmitted and received. The wireless communication chip 123 means a chip that performs communication depending on various communication protocols such as Institute of Electrical and Electronics Engineers 3rd (IEEE), Zigbee, generation (3G), 3rd generation partnership project (3GPP), long term evolution (LTE), and the like. The display 140 may display various screens on a display region. For example, the display 140 may display contents such as application execution screens, images, videos, and words.

At this time, the display 140 may be implemented as various types of display panels. For example, the display panel may be implemented by various display technologies such as a liquid crystal display (LCD), an organic light emitting diode (OLED), an active-matrix organic light-emitting diode (AM-OLED), a liquid crystal on silicon (LcoS), or a digital light processing (LDP).

In addition, the display 140 may also be coupled to at least one of a front region, a side region, and a rear region of the electronic device 100 in the form of a flexible display. The flexible display may be bent, curved, or rolled without being damaged through a thin and flexible substrate like paper. Such a flexible display may also be manufactured using a plastic substrate as well as a commonly used glass substrate. In the case of using the plastic substrate, the flexible display may be formed using a low-temperature manufacturing processor without using an existing manufacturing processor to prevent damage to the substrate. In addition, by replacing the glass substrate surrounding a flexible liquid crystal with a plastic film, flexibility to fold and unfold may be provided. The flexible display is not only thin and light, is also strong against impact, and also has an advantage of being able to curve or bend and be manufactured in various forms.

The inputter 150 is a configuration for receiving various inputs. In order to receive various inputs, the inputter 150 may include a touch panel, a pen sensor, a key, and a microphone. The touch panel may be configured by combining the display 140 and a touch sensor (not illustrated) and may use at least one of a capacitive manner, a resistive manner, an infrared manner, or an ultrasonic manner. The touch panel may have not only a display function but also a function of detecting a touch input position, a touched area, and a touch input pressure, and may also have a function of detecting a real-touch as well as a proximity touch. The pen sensor may be implemented as a portion of the touch panel, or may include a separate sheet for recognition. The key may include a physical button, an optical key, or a keypad. The microphone may include at least one of an internal microphone or an external microphone.

The audio processor 160 is a component that performs processing for audio data. The audio processor 160 may perform various processing such as decoding, amplification, noise filtering, and the like on the audio data. The audio data processed by the audio processor 160 may be output to the audio outputter 170.

The audio outputter 170 is a component that outputs various alarms or voice messages as well as various audio data on which various kinds of processing tasks such as decoding, amplification, noise filtering, and the like, are performed by the audio processor 160. In particular, the audio outputter 170 may be implemented as a speaker, but this is only one example, and the audio outputter 170 may be implemented as an output terminal that may output audio data.

The processor 130 may control overall operations of the electronic apparatus 100 using various programs stored in the memory 110.

The processor 130 may include a random access memory (RAM) 131, a read only memory (ROM) 132, a graphic processor 133, a main central processing unit (CPU) 134, first to n-th interfaces 135-1 to 135-n, and a bus 136. At this time, the RAM 131, the ROM 132, the graphic processor 133, the main CPU 134, the first to n-th interfaces 135-1 to 135-n, and the like, may be connected to each other through the bus 136.

The RAM 131 stores the O/S and the application programs. Specifically, when the electronic device 100 is booted, the O/S may be stored in the RAM 131 and various application data selected by the user may be stored in the RAM 131.

An instruction set for booting a system, or the like is stored in the ROM 132. When a turn-on command is input to supply power, the main CPU 134 may copy an operating system (O/S) stored in the memory 110 to the RAM 131 depending on an instruction stored in the ROM 132, and execute the O/S to boot the system. When the booting is completed, the main CPU 134 copies various application programs stored in the memory 110 to the RAM 131, and executes the application programs copied to the RAM 131 to perform various operations.

The graphic processor 133 renders a screen including various objects such as an item, an image, a word, and the like, using a calculator (not illustrated) and a renderer (not illustrated). Here, the calculator may be a configuration that calculates attribute values, such as coordinate values, shapes, sizes, and colors, to which each object is to be displayed according to a layout of a screen using a control command received from the inputter 150. In addition, the renderer may be a configuration that generates a screen of various layouts including the objects on the basis of the attribute values calculated by the calculator. The screen generated by such a renderer may be displayed in a display region of the display 120.

The main CPU 134 accesses the memory 110 to perform the booting using the OS stored in the memory 110. In addition, the main CPU 134 performs various operations using various programs, contents, data, and the like, stored in the memory 110.

The first to n-th interfaces 135-1 to 135-n are connected to the various components described above. One of the first to n-th interfaces 135-1 to 135-n may also be a network interface connected to an external device through a network.

Meanwhile, the processor 130 may include a first processor 130-1 and a second processor 130-2 as illustrated in FIG. 3C. At this time, the first processor 130-1 may be a part of an existing general-purpose processor (e.g., CPU or application processor) or a graphic dedicated processor (e.g., GPU), and the second processor 130-2 may be an artificial intelligence dedicated processor for artificial intelligence (AI).

In particular, the second processor 130-2 may learn a security parameter determination criteria by receiving learning data for determining a security parameter value according to the importance of the application, and may acquire an importance of application and a security parameter value according the importance of application by using information on the application as input data when the application stored in the memory 110 is executed.

Figure 4A:
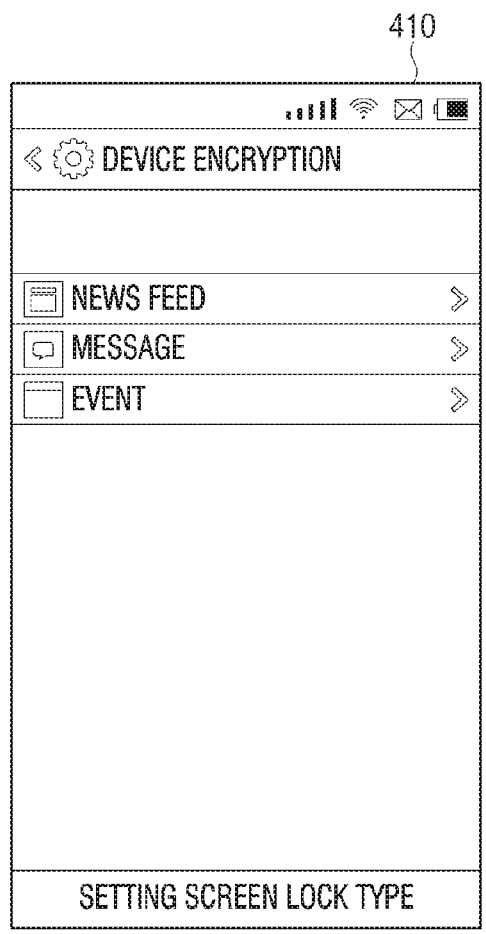
FIGS. 4A, 4B and 4C are illustrative diagrams for describing a method for determining a security parameter according to an embodiment of the disclosure.
Figure 4B:
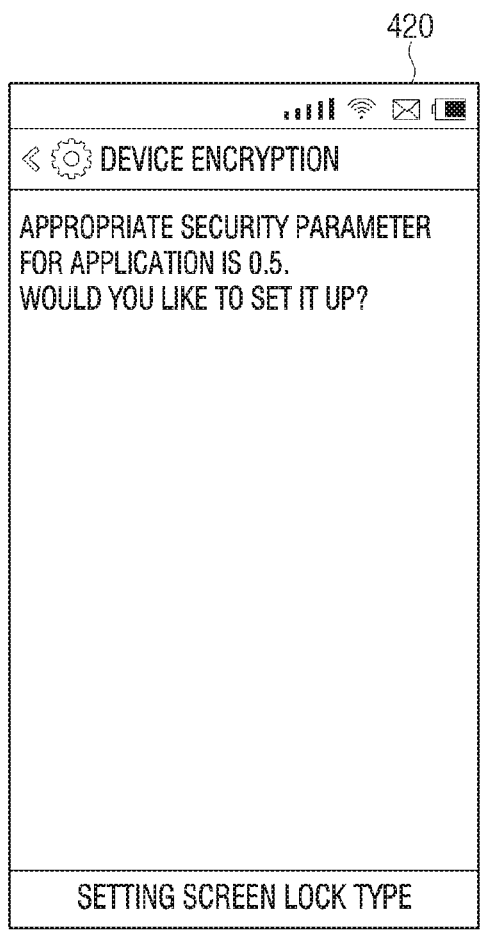
Figure 4C:
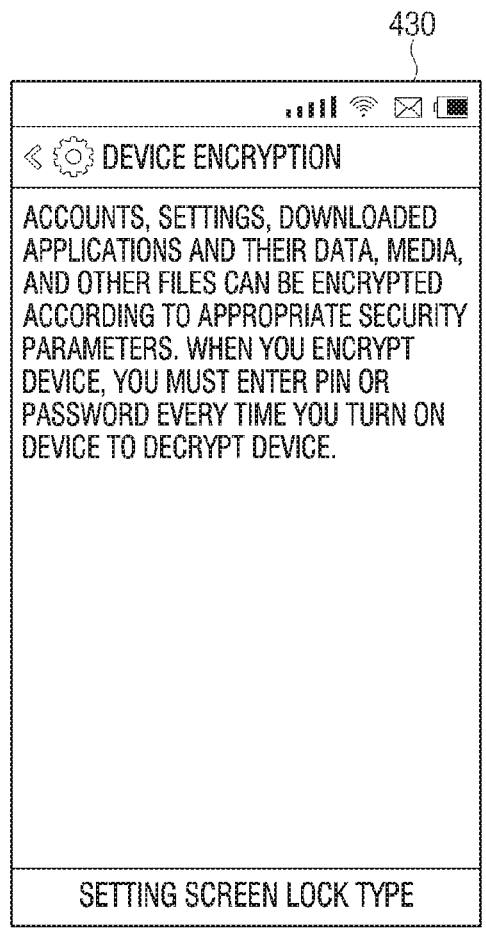

FIGS. 4A to 4C are illustrative diagrams for describing a method for determining a security parameter according to an embodiment of the disclosure.

The electronic device 100 may differently set a security parameter according to the degree of security needs of the application or data processed by the application. That is, the electronic device 100 may set a security parameter of an application that processes data whose security is important to be low, and may set a security parameter of an application that processes data whose accuracy is important to be high.

In order to set the security parameters, the electronic device 100 may provide a first UI 410 illustrated in FIG. 4A. That is, the user may set different security parameters for each application through the first UI 410. Meanwhile, when a user command for selecting a first application 411 among a plurality of application icons included in the first UI 410 is input, the electronic device 100 may provide the user with a second UI 420 that guides an appropriate security parameter of the first application 411. As illustrated in FIG. 4B, the second UI may display a message for guiding a security parameter setting for one of the plurality of applications.

Alternatively, as illustrated in FIG. 4C, the electronic device 100 may also provide the user with a third UI 430 for collectively setting the security parameter for all applications and data. In other words, in the general case, because the user often does not pay much attention to security issues, the electronic device 100 may collectively set the security parameter for all applications and data through the third UI.

Figure 5A:
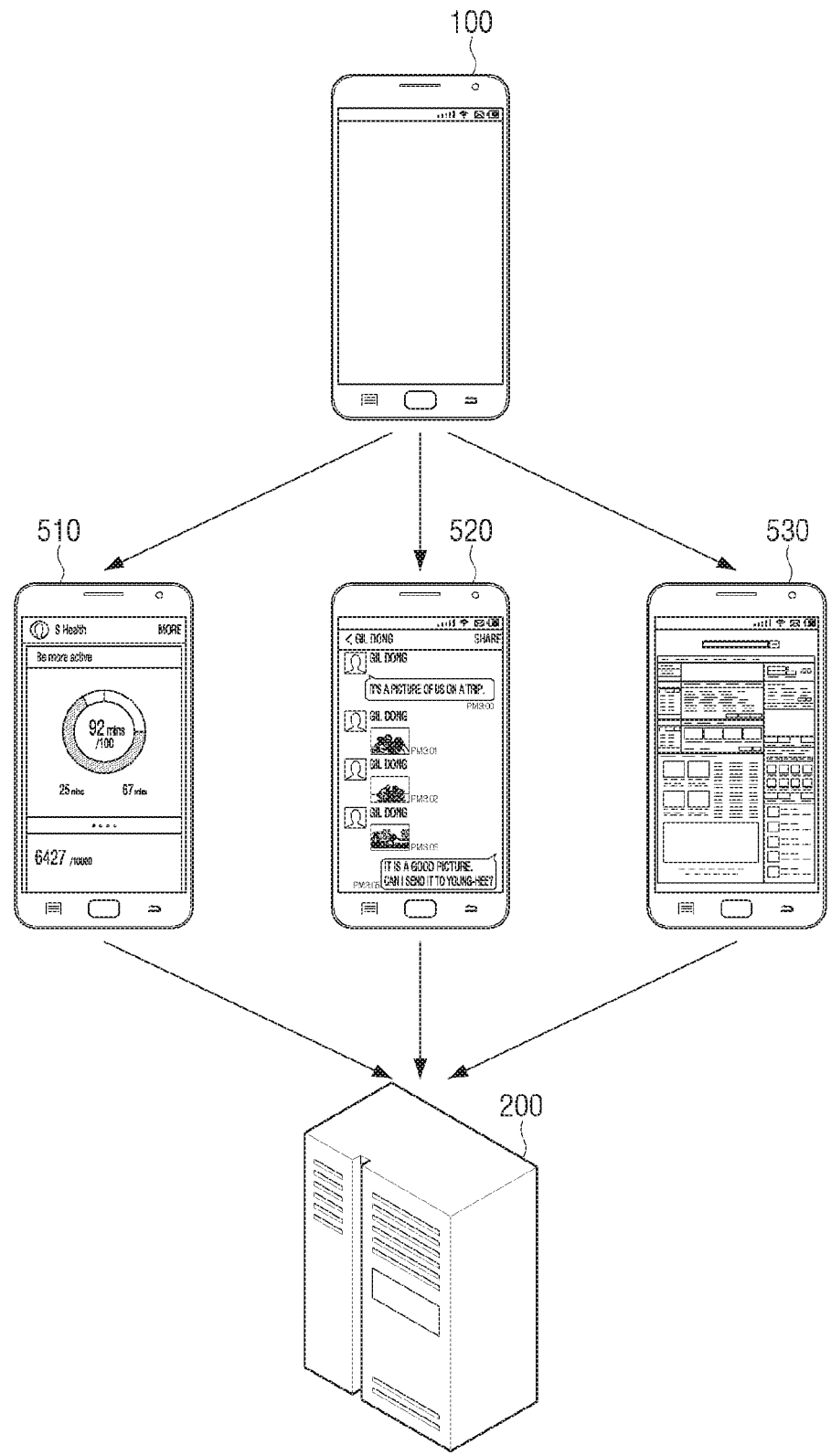
FIGS. 5A and 5B are illustrative diagram for describing a method for setting a security parameter according to an application.
Figure 5B:
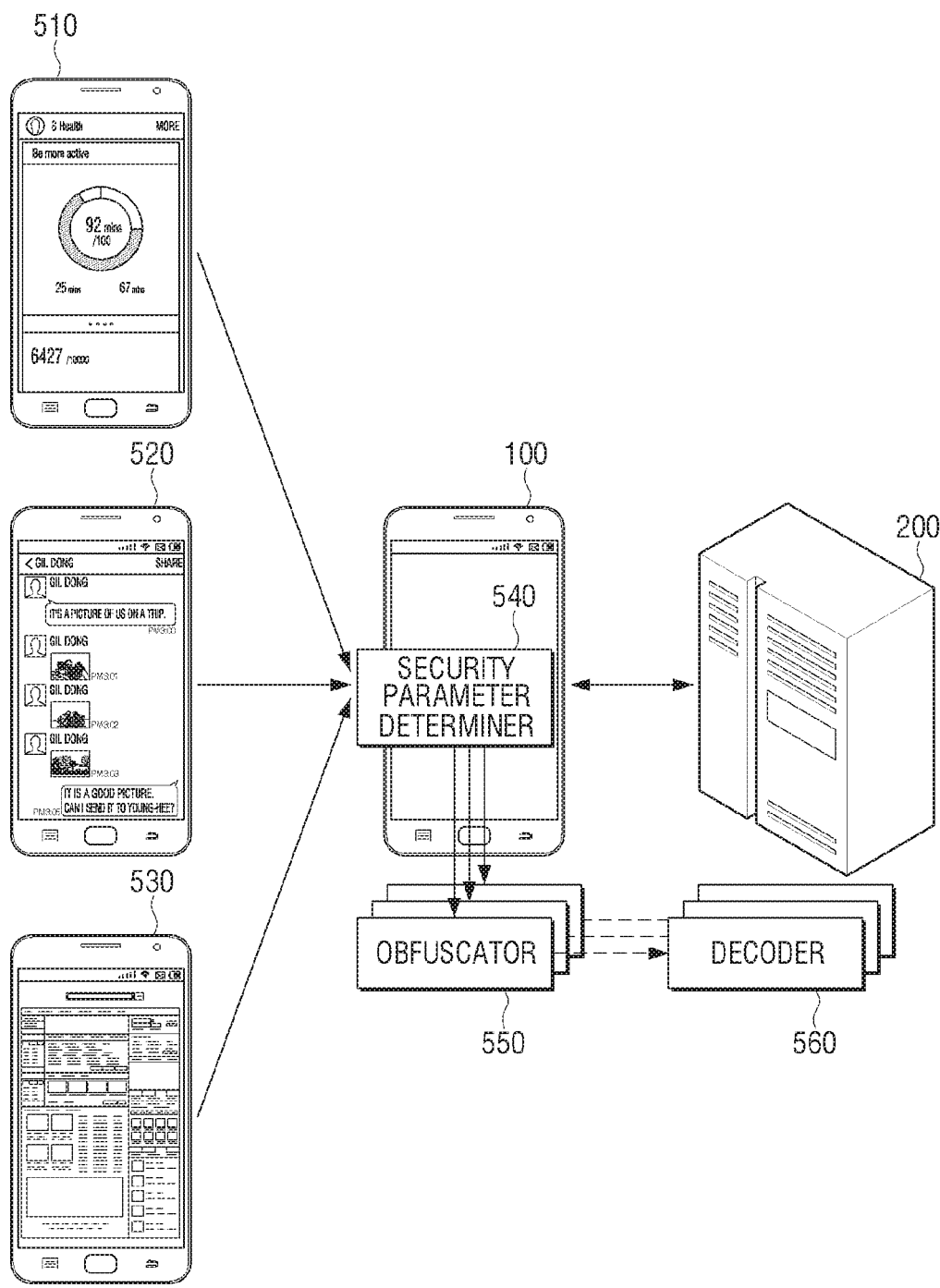

FIGS. 5A and 5B are illustrative diagram for describing a method for setting a security parameter according to an application.

As illustrated in FIG. 5A, the electronic device 100 may execute various applications and transmit data processed by each application to the server 200. For example, when a first application 510 is a health-related application, a second application 520 is a messenger-related application, and a third application 530 is a search portal site-related application, the electronic device 100 may determine the importance of each application. When it is determined that the importance of the first application 510 is high, the importance of the second application 520 is medium, and the importance of the third application 530 is low, the electronic device 100 may set the security parameters according to the importance of each application. For example, the electronic device 100 may determine the security parameter of the first application 510 as $\varepsilon 1$, the security parameter of the second application 520 as $\varepsilon 2$, and the security parameter of the third application 530 as $\varepsilon 3$. At this time, as described above, as the value of the security parameter is smaller, the obfuscation and decoding are performed with higher security, and therefore, in the above-described embodiment, each security parameter may satisfy $\varepsilon 1 < \varepsilon 2 < \varepsilon 3$.

On the other hand, as illustrated in FIG. 5B, the security parameter may be determined by a security parameter determiner in the processor 130. At this time, the security parameter may be determined by various methods. At this time, the security parameter determiner 540 may be configured as the second processor 130-2. That is, the security parameter determiner 540 may be a configuration included in the artificial intelligence dedicated processor.

As an example, the security parameter may be determined based on the name and category information of the application being executed, the name of the data collected by the application, the variable name of the data collected by the application, and the program source code related to the data collected by the application.

Specifically, the security parameter may be determined by analyzing an application for which the security parameter is determined. For example, when a security parameter of a specific application related to SNS is set to any ε, a security parameter of a new SNS application may be determined based on the SNS application in which the security parameter is determined as any ε. That is, the electronic device 100 may determine the security parameter for the new application by analyzing the application for which the security parameter is determined.

Alternatively, the security parameter may be determined by analyzing an application executed together with the application. For example, when an application for which the security parameter is to be determined is a financial-related application and the corresponding financial-related application is executed together with a security application, the electronic device 100 may determine a security parameter of the financial application based on information of the security application.

Meanwhile, the security parameter may be determined according to the type of data, independent of the importance of the application. That is, even in a case in which a security strength of the application is low, when the data to be transmitted has a great need for security, the electronic device 100 may determine a value of the security parameter according to the type of data to be transmitted.

As an example, the electronic device 100 may classify various data stored in the memory 110 according to a specific criterion. For example, when the data belongs to common data, the electronic device 100 may determine the security parameter for the data regardless of the importance of the application. At this time, the common data may be data having a low need for security, such as data received from the server 200. Alternatively, the common data may also not be transmitted to the server 200 without determining the security parameter by being determined by the server 200 as data that does not need to be collected from the electronic device 100.

When the security parameters for obfuscating the application and the data transmitted from the application are determined according to the various methods described above, an obfuscator 550 may obfuscate the data according to the determined security parameters. The electronic device 100 may transmit the obfuscated data to the server 200.

A decoder 560 of the server 200 may decode the obfuscated data. At this time, the server 200 may receive the security parameters corresponding to each data from the electronic device 100 together. That is, the server 200 may decode the obfuscated data according to the security parameter corresponding to the obfuscated data.

Figure 6:
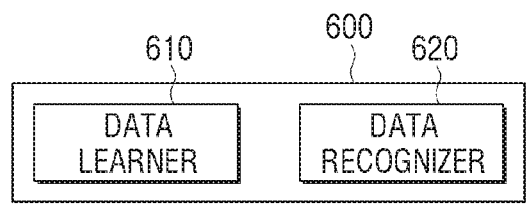
FIG. 6 is a block diagram of a processor according to some embodiments of the disclosure.

FIG. 6 is a block diagram of a processor according to some embodiments of the disclosure.

Referring to FIG. 6, a processor 600 according to some embodiments may include a data learner 610 and a data recognizer 620. The processor 600 may be the processor 130 of the electronic device 100, or may also be the processor of the server 200. The processor 600 may be used to determine the importance and security parameters of an application or data.

The data learner 610 may learn a criterion for determining the importance of the application or data or a criterion for determining the security parameter according to the importance of the application or data. The data learner 610 may generate or learn a data recognition model to have the criterion for determining the importance of the application or data or the criterion for determining the security parameter according to the importance of the application or data.

As an example, the data learner 610 may generate or learn the data recognition model using learning data related to the name and category information of the application being executed, the name of the data collected by the application, the variable name of the data collected by the application, and the program source code related to the data collected by the application.

The data recognizer 620 may determine the importance and security parameters of the application or data based on recognition data. The data recognizer 620 may recognize the application, the importance of data, and the security parameter according to the learned criterion using the learned data recognition model. The data recognizer 620 may acquire predetermined recognition data according to a predetermined criterion, and may determine (or estimate) the importance and security parameter of the application or data by applying the acquired recognition data as an input value to the data recognition model.

In addition, a result value output by applying the acquired recognition data as the input value to the data recognition model may be used to update the data recognition model.

As an example, the data recognizer 620 may determine the importance of the application or data by using recognition data related to the name and category information of the application being executed, the name of the data collected by the application, the variable name of the data collected by the application, and the program source code related to the data collected by the application, as the input value.

In addition, the data recognizer 620 may acquire the security parameter by using recognition data related to the importance and security parameter of the application or data as the input value.

At least a portion of the data learner 610 and at least a portion of the data recognizer 620 may be implemented as a software module or manufactured in the form of at least one hardware chip and mounted on the electronic device. For example, at least one of the data learner 610 or the data recognizer 620 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of electronic devices described above. At this time, the dedicated hardware chip for artificial intelligence is a dedicated processor specialized for a probability calculation, and has higher parallel processing performance than the conventional general-purpose processor, and may thus quickly process calculation operations in an artificial intelligence field such as machine learning. When the data learner 610 and the data recognizer 620 are implemented as a software module (or a program module including instructions), the software module may be stored in a non-transitory computer readable media. In this case, the software module may be provided by an operating system (OS), or may be provided by a predetermined application. Alternatively, a portion of the software module may be provided by the operating system (OS), and the remaining of the software module may be provided by the predetermined application.

In this case, the data learner 610 and the data recognizer 620 may also be mounted in one electronic device, or may also be mounted in separate electronic devices, respectively. For example, one of the data learner 610 and the data recognizer 620 may be included in the electronic apparatus 100, and the other may be included in an external server. In addition, the data learner 610 and the data recognizer 620 may also provide model information constructed by the data learner 610 to the data recognizer 620 by a wired or wireless line, and the data input to the data recognizer 620 may also be provided to the data learner 610 as additional learning data.

Figure 7A:
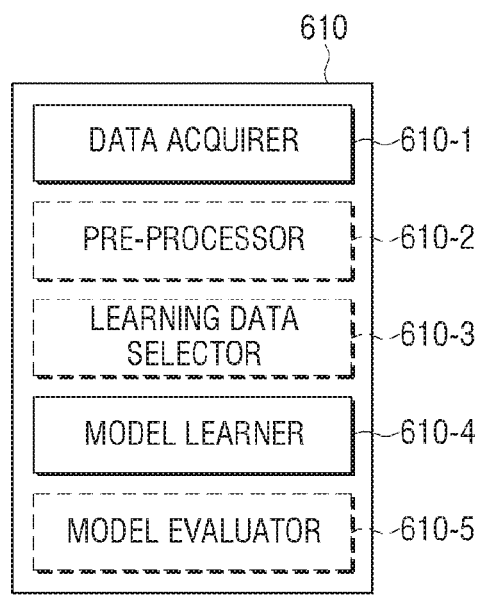
FIG. 7A is a block diagram of a data learner according to an embodiment of the disclosure.

FIG. 7A is a block diagram of the data learner 610 according to an embodiment of the disclosure.

Referring to FIG. 7A, the data learner 610 according to some embodiments may include a data acquirer 610-1 and a model learner 610-4. In addition, the data learner 610 may selectively further include at least one of a pre-processor 610-2, a learning data selector 610-3, or a model evaluator 610-5.

The data acquirer 610-1 may acquire learning data necessary for learning to determine the importance and security parameter value of the application or data.

As the learning data, data collected or tested by the data learner 610 or a manufacturer of the electronic device 100 may also be used. Alternatively, the learning data may include data for the importance and security parameter of the application or data set by the user according to the disclosure. Specifically, the learning data may be data for an application to which the importance or security parameter of the application is applied in the current electronic device 100.

The model learner 610-4 may learn the data recognition model so as to have a determination criterion regarding how the data recognition model determines the importance of the application or data by using the learning data. For example, the model learner 610-4 may learn the data recognition model through supervised learning using at least a portion of the learning data as the determination criterion. Alternatively, the model learner 610-4 may learn the data recognition model through unsupervised learning of finding the determination criterion for determining the importance and security parameter value of the application or data by performing self-learning using the learning data without any supervision, for example.

In addition, the model learner 610-4 may also learn a selection criterion about which learning data should be used for determining the importance and security parameter value of the application or data.

In particular, the model learner 610-4 according to an embodiment of the disclosure may generate or learn the data recognition model using learning data related to the name and category information of the application being executed, the name of the data collected by the application, the variable name of the data collected by the application, and the program source code related to the data collected by the application.

Alternatively, the data learner 610 may generate or learn the data recognition model using the learning data related to the determined importance of the application or data.

Meanwhile, the data recognition model may be a model that is previously built and updated by learning of the model learner 610-4. In this case, the data recognition model may be previously built by receiving basic learning data (e.g., appropriate security parameters for an application used by a plurality of users).

The data recognition model may be built in consideration of an application field of the recognition model, the purpose of learning, or a computer performance of the device. The data recognition model may be, for example, a model based on a neural network. The data recognition model may be designed to simulate a human's brain structure on a computer. The data recognition model may include a plurality of network nodes having weights that simulate neurons in a human' neural network. The plurality of network nodes may form a connection relationship so that the neurons simulate synaptic activity through which signals are transmitted and received through synapses. The data recognition model may include, for example, a neural network model or a deep learning model developed from the neural network model. In the deep learning model, the plurality of network nodes may be located at different depths (or layers) and transmit and receive data according to a convolution connection relationship.

For example, as the data recognition model, models such as a deep neural network (DNN), a recurrent neural network (RNN), and a bidirectional recurrent deep neural network (BRDNN) may be used, but the data recognition model is not limited thereto.

According to diverse embodiments, when there are a plurality of pre-constructed data recognition models, the model learner 610-4 may determine a data recognition model having a high relation between the input learning data and basic learning data as a data recognition model to be learned. In this case, the basic learning data may be pre-classified for each type of data, and the data recognition model may be pre-constructed for each type of data. For example, the basic learning data may be pre-classified by various criteria such as an area in which the learning data is generated, a time at which the learning data is generated, a size of the learning data, a genre of the learning data, a generator of the learning data, types of objects in the learning data, and the like.

In addition, the model learner 610-4 may learn the data recognition model by using a learning algorithm or the like including, for example, error back-propagation or gradient descent.

In addition, the model learner 610-4 may learn the data recognition model through supervised learning using, for example, various application information described above as the input value. Alternatively, the model learner 610-4 may learn the data recognition model through unsupervised learning of finding the determination criterion for the importance and security parameter of the application or data by performing self-learning using the necessary learning data without any supervision, for example. In addition, the model learner 610-4 may learn the data recognition model through reinforcement learning using a feedback as to whether a result of the determination of the importance and security parameter of the application or data according to the learning is correct, for example.

In addition, when the data recognition model is learned, the model learner 610-4 may store the learned data recognition model. In this case, the model learner 610-4 may store the learned data recognition model in the memory 110 of the electronic device 100. Alternatively, the model learner 610-4 may store the learned data recognition model in the memory of the server connected to the electronic device 100 via a wired or wireless network.

The data learner 610 may further include a pre-processor 610-2 and a learning data selector 610-3 to improve a recognition result of the data recognition model or to save resources or time required for generation of the data recognition model.

The pre-processor 610-2 may pre-process the data acquired by the data acquirer 610-1 for use in learning for determination of the importance and security parameter of the application or data.

For example, the pre-processor 610-2 may process the acquired data into a predefined format so that the model learner 610-4 may easily use the data for learning the data recognition model. The pre-processed data may be provided to the model learner 610-4 as the learning data.

Alternatively, the learning data selector 610-3 may selectively select leaning data necessary for learning from the pre-processed data. The selected learning data may be provided to the model learner 610-4. The learning data selector 610-3 may select learning data necessary for learning from the pre-processed data, according to a predetermined selection criterion. In addition, the learning data selector 610-3 may also select the learning data necessary for learning according to a predetermined selection criterion by learning by the model learner 610-4. As an embodiment of the disclosure, the learning data selector 610-3 may select only the name and category information of the application to be executed among the inputted learning data.

The data learner 610 may further include a model evaluator 610-5 to improve the recognition result of the data recognition model.

The model evaluator 610-5 may input evaluation data to the data recognition model, and may cause the model learner 610-4 to learn again when the recognition result outputted from the evaluation data does not satisfy a predetermined criterion. In this case, the evaluation data may be predefined data for evaluating the data recognition model.

For example, when the number or ratio of evaluation data in which the recognition result is not correct among the recognition results of the learned data recognition model for the evaluation data exceeds a predetermined threshold value, the model evaluator 610-5 may evaluate that the predetermined criterion is not satisfied. For example, in a case in which the predetermined criterion is defined as a ratio of 2%, if the learned data recognition model outputs incorrect recognition results for the evaluation data exceeding 20 among a total of 1000 evaluation data, the model evaluator 610-5 may evaluate that the learned data recognition model is not suitable.

Meanwhile, when a plurality of learned data recognition models exist, the model evaluator 610-5 may evaluate whether each of the learned data recognition models satisfies the predetermined criterion, and determine a model satisfying the predetermined criterion as a final data recognition model. In this case, when there are a plurality of models satisfying the predetermined criterion, the model evaluator 610-5 may determine any one or a predetermined number of models previously set in descending order of evaluation score as the final data recognition model.

At least one of the data acquirer 610-1, the pre-processor 610-2, the learning data selector 610-3, the model learner 610-4, or the model evaluator 610-5 described above may be implemented as a software module or manufactured in the form of at least one hardware chip and mounted on the electronic device. For example, at least one of the data acquirer 610-1, the pre-processor 610-2, the learning data selector 610-3, the model learner 610-4, or the model evaluator 610-5 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of electronic devices described above.

In addition, the data acquirer 610-1, the pre-processor 610-2, the learning data selector 610-3, the model learner 610-4, and the model evaluator 610-5 may also be mounted on one electronic device, or may also be mounted on each of the separate electronic devices. For example, some of the data acquirer 610-1, the pre-processor 610-2, the learning data selector 610-3, the model learner 610-4, and the model evaluator 610-5 may be included in the electronic device, and the remaining may be included in the server.

In addition, at least one of the data acquirer 610-1, the pre-processor 610-2, the learning data selector 610-3, the model learner 610-4, or the model evaluator 610-5 may be implemented as a software module. When at least one of the data acquirer 610-1, the pre-processor 610-2, the learning data selector 610-3, the model learner 610-4, or the model evaluator 610-5 is implemented as the software module (or a program module including instructions), the software module may be stored in a non-transitory computer readable medium. In addition, in this case, at least one software module may be provided by an operating system (OS), or may be provided by a predetermined application. Alternatively, some of at least one software module may be provided by the operating system (OS), and the remaining of the software module may be provided by the predetermined application.

Figure 7B:
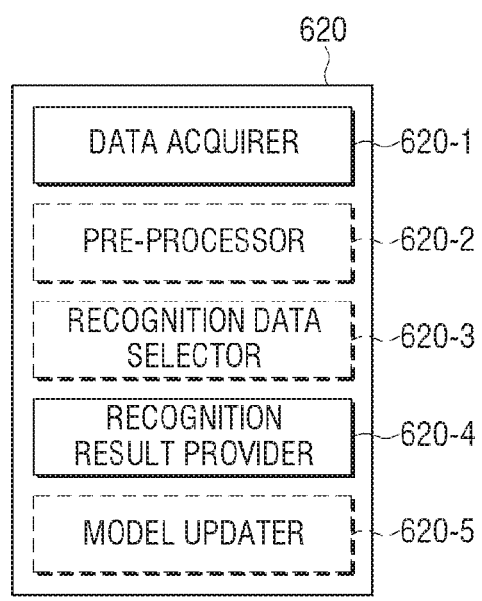
FIG. 7B is a block diagram of a data recognizer according to some embodiments.

FIG. 7B is a block diagram of the data recognizer 620 according to some embodiments.

Referring to FIG. 7B, the data recognizer 620 according to some embodiments may include a data acquirer 620-1 and a recognition result provider 620-4. In addition, the data recognizer 620 may selectively further include at least one of a pre-processor 620-2, a recognition data selector 620-3, or a model updater 620-5.

The data acquirer 620 may acquire recognition data necessary for determining the importance and security parameter of the application or data.

The recognition result provider 620-4 may determine the importance and security parameter of the application or data by applying the data acquired by the data acquirer 620-1 as an input value to the learned data recognition model. The recognition result provider 620-4 may provide a recognition result according to a recognition purpose of the data. Alternatively, the recognition result provider 620-4 may provide a recognition result acquired by applying data which is pre-processed by a pre-processor 620 to be described later as an input value to the learned data recognition model. Alternatively, the recognition result provider 620-4 may provide the recognition result by applying data selected by a recognition data selector 620-3 to be described later as an input value to the data recognition model.

The data recognizer 1210 may further include a pre-processor 620-2 and a recognition data selector 620-3 to improve the recognition result of the data recognition model or to save resources or time required for providing the recognition result.

The pre-processor 620-2 may pre-process the data acquired by the data acquirer 620-1 for using in recognition for determination of the importance and security parameter of the application or data.

The pre-processor 620-2 may process the acquired data into a predefined format so that the recognition result provider 620-4 may easily use the data for determination of the importance and security parameter of the application or data.

The recognition data selector 620-3 may select recognition data necessary for determining the importance and security parameter of the application or data among the pre-processed data. The selected recognition data may be provided to the recognition result provider 620-4. The recognition data selector 620-3 may select recognition data necessary for determining the importance and security parameter of the application or data among the pre-processed data, according to a predetermined selection criterion. In addition, the recognition data selector 620-3 may also select the data according to a predetermined selection criterion by learning by the model learner 610-4 described above.

The model updater 620-5 may control the data recognition model to be updated based on the evaluation for the recognition result provided by the recognition result provider 620-4. For example, the model updater 620-5 may control the model learner 610-4 to update the data recognition model by providing the recognition result provided by the recognition result provider 620-4 to the model learner 610-4.

At least one of the data acquirer 620-1, the pre-processor 620-2, the recognition data selector 620-3, the recognition result provider 620-4, or the model updater 620-5 in the data recognizer 620 described above may be implemented as a software module or manufactured in the form of at least one hardware chip and mounted on the electronic device. For example, at least one of the data acquirer 620-1, the pre-processor 620-2, the recognition data selector 620-3, the recognition result provider 620-4, or the model updater 620-5 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of electronic devices described above.

In addition, the data acquirer 620-1, the pre-processor 620-2, the recognition data selector 620-3, the recognition result provider 620-4, and the model updater 620-5 may also be mounted on one electronic device, or may also be mounted on each of the separate electronic devices. For example, some of the data acquirer 620-1, the pre-processor 620-2, the recognition data selector 620-3, the recognition result provider 620-4, and the model updater 620-5 may be included in the electronic device, and the remaining may be included in the server.

In addition, at least one of the data acquirer 620-1, the pre-processor 620-2, the recognition data selector 620-3, the recognition result provider 620-4, or the model updater 620-5 may be implemented as a software module. When at least one of the data acquirer 620-1, the pre-processor 620-2, the recognition data selector 620-3, the recognition result provider 620-4, or the model updater 620-5 is implemented as the software module (or a program module including instructions), the software module may be stored in a non-transitory computer readable medium. In addition, in this case, at least one software module may be provided by an operating system (OS), or may be provided by a predetermined application. Alternatively, some of at least one software module may be provided by the operating system (OS), and the remaining of the software module may be provided by the predetermined application.

In the diverse embodiments described above, the method of determining an appropriate security parameter for data has been described. Hereinafter, a method of obfuscating and decoding data using the determined security parameter will be described with reference to FIGS. 8 and 9.

Figure 8:
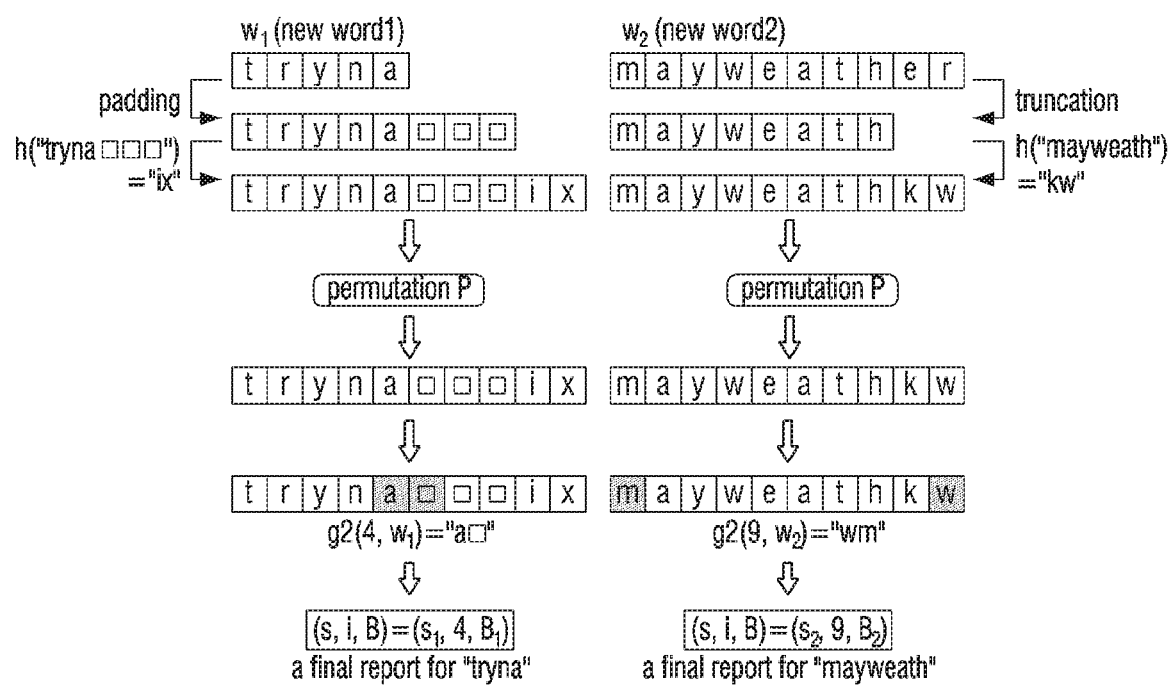
FIG. 8 is an illustrative diagram for describing a method for obfuscating data according to an embodiment of the disclosure.

FIG. 8 is an illustrative diagram for describing a method for obfuscating data according to an embodiment of the disclosure. For convenience of description, it is assumed that the data in the disclosure is word. However, the disclosure is not limited thereto, and the same technical idea may be applied to various data such as images, voice, and programs as well as the word.

The electronic device 100 may set a length (a predetermined second size) of a word for obfuscation. In the case of FIG. 8, the electronic device 100 will be described with an example of a word of eight letters, but this may be arbitrarily set.

Assuming that the words for obfuscation are "tryna" and "mayweather". The electronic device 100 may generate "tryna ☐☐☐" by adding three letters because the tryna is five letters. At this time, ☐ may be a null character. On the other hand, the electronic device 100 may generate "mayweath" in which the last two letters are truncated because the mayweather is ten letters.

Through the method as described above, the electronic device 100 may generate words of eight letters having a predetermined second size by performing padding or truncation for each word. When the word having the predetermined second size is generated, the electronic device 100 may generate a fingerprint for the generated word. As described above, the finger print may be generated through the hash function. In the embodiment, the case where the fingerprint for an input value is two letters is described, but the fingerprint may be any length. The electronic device 100 may acquire a fingerprint "ix" by inputting "tryna ☐☐☐" into the hash function, and acquire a fingerprint "kw" by inputting "mayweath" into the same hash function.

The electronic device 100 may apply the words acquired through padding and truncation and the fingerprint for each word as a single word to a predetermined permutation matrix. That is, the electronic device 100 may use the predetermined permutation matrix to enhance security of the word. In some cases, a variety of matrices having an inverse matrix may be used as well as the permutation matrix. In the disclosure, for convenience of description, a case where the predetermined permutation matrix is a unit matrix will be described as an example.

Because the predetermined permutation matrix is the unit matrix, the words transformed by applying the permutation matrix to each word may be "tryna ☐☐☐ ix" and "mayweathkw".

The electronic device 100 may generate a set of cyclic-duplicate n-gram sets based on the words to which the permutation matrix is applied. At this time, the n-gram set refers to a set generated according to the number of words. For example, if the word consists of English alphabets (lowercase) including null characters, the set of 2-gram sets may be { ☐☐ , ☐a, . . . aa, ab, ac . . . zz}. That is, the set of 2-gram sets may be a set having a total of 729 ($27^2$) elements. In the disclosure, only the case of the 2-gram sets is described for convenience of explanation, but the same technical idea may be applied to any n-gram sets such as 3-gram sets and 4-gram sets. In addition, in the disclosure, the words are limited to the case of the null character and the lowercase of the alphabet, but the words may include uppercase of the alphabet, other special symbols, and various characters used in other languages.

Hereinafter, the set of 2-gram sets that are cyclic-duplicated for "tryna ☐☐☐ ix" and "mayweathkw" will be described. The electronic device 100 may generate divided data including duplicate data having a predetermined third size for "tryna▯▯▯ix" and "mayweathkw". That is, the electronic device 100 may generate a set of {tr, ry, yn, na, a ▯, ▯▯ , ▯▯ , ▯i, ix, xt} for "tryna▯▯▯ix", and generate a set of {ma, ay, yw, we, ea, at, th, hk, kw, wm} for "mayweathkw". That is, the meaning of duplication means that elements adjacent to each other have the predetermined third size (one letter in the embodiment of FIG. 8) therebetween, and the meaning of the cycle means that a first element and the last element also include the duplicate data having the predetermined third size.

The electronic device 100 may add indexes to the elements included in the generated set. That is, the electronic device 100 may add indexes 0 to 9 in order to tr, ry, yn, na, a ▯, ▯▯ , ▯▯ , ▯i, ix, xt, and add the indexes 0 to 9 in order to ma, ay, yw, we, ea, at, th, hk, kw, wm in the same method. The index may be used when sorting to decode words, as described below.

Thereafter, the electronic device 100 may select any element among the respective elements and obfuscate the selected element. For example, as illustrated in FIG. 8, the electronic device 100 may select a▯ corresponding to the index 4 for "tryna ▯▯▯ ix" and select wm corresponding to the index 9 for "mayweathkw". At this time, the probability of selecting any element among the respective elements may be the same probability. However, the disclosure is not limited thereto, and the electronic device 100 may select the element according to different probability.

The electronic device 100 may generate a report by obfuscating one selected element. At this time, the electronic device 100 may generate a report by obfuscating the selected element by applying a differentially privacy algorithm. For example, the electronic device 100 may generate a report of $(s, i, B)=(s_1, 4, B_1)$ by applying a▯ to the differentially privacy algorithm, and generate a report of $(s, I, B)=(s_2, 9, B_2)$ by applying wm to the differentially privacy algorithm. At this time, the form of the report (s, i, B) may vary depending on which differential privacy algorithm is applied to a 27-th 2-gram called a▯. That is, although the above-described embodiment discloses the report including three variables, the number of variables included in the report may vary. The generated report may include index information, and information about which element is the selected element among the total 2-gram. For example, the report on a▯ may include information on the index 4 and information on the 27-th element among the total 2-gram. In the same method, the report on wm may include information on the index 9 and information on the 634-th element among the total 2-gram. In addition, the generated report includes information about the finger print, but because the information on the obfuscated finger print is only included, the information on the finger print may not be acquired from each single report.

Through the above-described method, the electronic device 100 may generate one report for one word.

Figure 9:
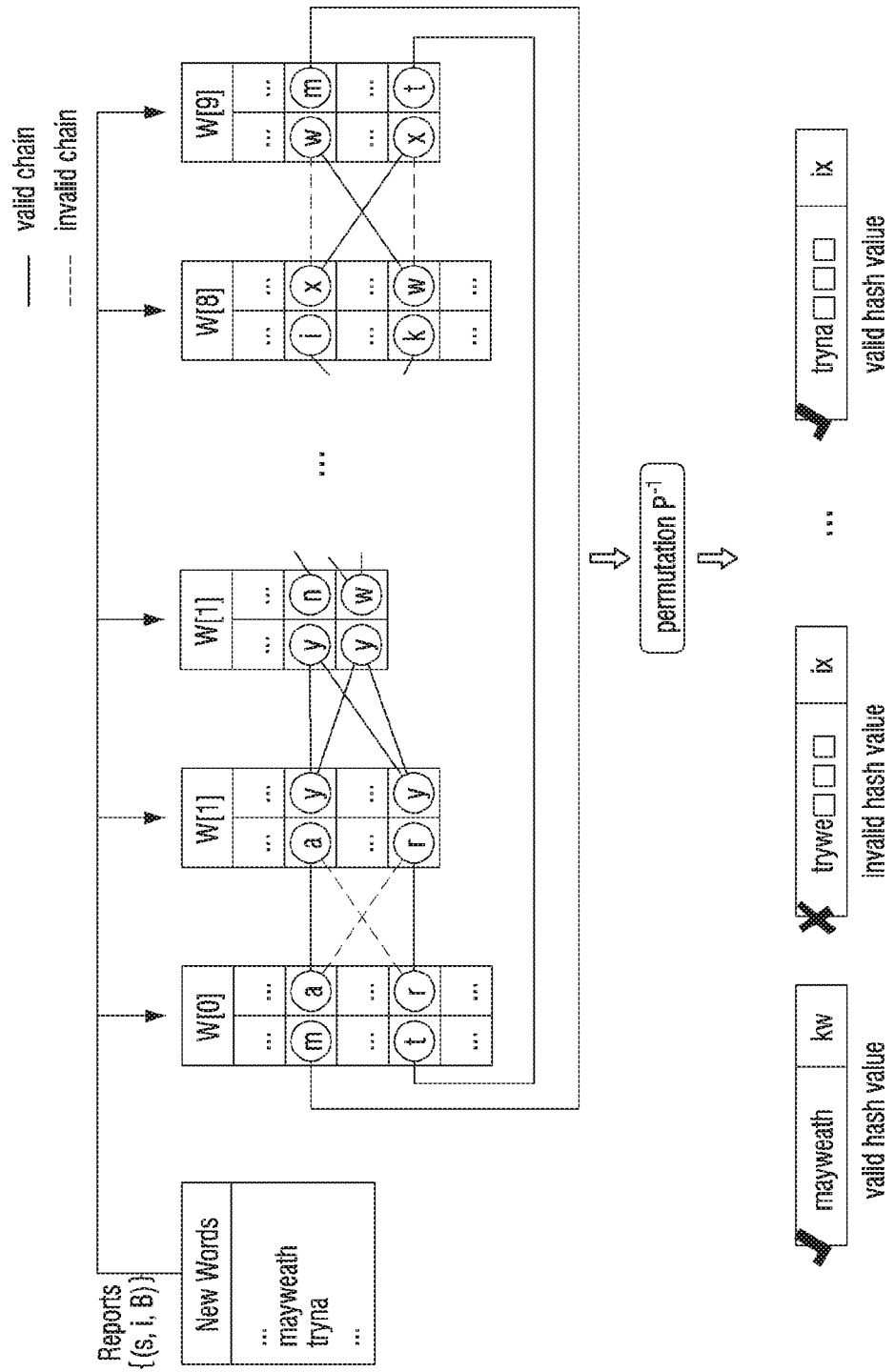
FIG. 9 is an illustrative diagram for describing a method for decoding data according to an embodiment of the disclosure.

FIG. 9 is an illustrative diagram for describing a method for decoding data according to an embodiment of the disclosure.

The server 200 may receive various reports from a plurality of electronic devices. The server 200 may sort the received reports for each index. At this time, the server 200 may restore the report only for elements collected over a predetermined number of times among the reports sorted by a specific index. For example, when a plurality of reports including index 0 are collected, a predetermined number of times is 10000, 50 reports for aa are collected, 12000 reports for ma are collected, 11000 reports for tr are collected, and 9900 reports for ji are collected, the server 200 may restore only the reports for ma and tr exceeding the predetermined number of times.

The server 200 may restore the word transmitted by the electronic device 100 by using the elements of the 2-gram sorted and restored for each index. Specifically, because the word transmitted by the electronic device 100 includes the duplicate data having the predetermined third size with respect to adjacent indexes, the server 200 may estimate the word transmitted by the electronic device 100 by using the feature including the duplicate data. Like the obfuscation process described above, in the disclosure, only the case of the 2-gram sets is described for convenience of explanation, but the same technical idea may be applied to any n-gram sets such as 3-gram sets and 4-gram sets.

That is, in FIG. 9, a solid line indicates a case where duplicate data is the same, and a dotted line indicates a case where duplicate data is not the same. By such a method, the server 200 may acquire at least one word. The server 200 may acquire at least one candidate word by applying the at least one acquired word to an inverse matrix of a predetermined permutation matrix. At this time, it is obvious that the predetermined permutation matrix should be the same matrix as a matrix used by the electronic device 100 in the obfuscation process. For example, the server 200 may acquire candidate words such as "mayweathkw", "trywe ▯▯▯ix", and "tryna ▯▯▯ ix" through the method described above.

The server 200 may separate the finger print from the acquired candidate words. In the embodiment, because the finger print is inserted into the last two letters, the server 200 may determine the last two letters of the candidate word as the finger print.

The server 200 may apply a word excluding the finger-print among the candidate words to a hash function. At this time, the hash function applied by the server 200 is the same as the hash function applied by the electronic device 100. That is, the server 200 may determine whether candidate data is accurate data by comparing the finger print with a hash value that the word excluding the finger print among the candidate words is applied to the hash function.

For example, the server 200 may acquire the hash value by applying "mayweath", "trywe ▯▯▯ ", and "tryna ▯▯▯ " to each hash function. In this case, the hash value of "mayweath" is kw, and the hash value of "tryna ▯▯▯ " is ix, which is the same as that of finger print, but the hash value of "trywe ▯▯▯ " is, for example, hj, which may be different from the finger print ix. The server 200 may determine that the words transmitted by the electronic device 100 are "mayweath" and "tryna ▯▯▯ ", and recognize that "trywe ▯▯▯ " is an incorrectly acquired word.

Through the method as described above, the server 200 may determine that data collected from the plurality of electronic devices are "mayweath" and "tryna ▯▯▯ ". At this time a word smaller than the predetermined second size (eight letters) is restored as it is as the user inputs the word, but a word greater than the predetermined second size (eight letters) is not restored as it is as the user inputs the word. At this time, the server 200 may estimate an original word "mayweather" by analyzing "mayweath". For example, the server 200 may build a learning model related to word completion by inputting various data related to automatic word completion or data related to grammar information into the artificial intelligence model as learning data. When the learning model related to the word completion is built, the server 200 may estimate the original word by inputting the decoded word into the artificial intelligence model as input data. At this time, in the embodiment of FIGS. 8 and 9, only words that do not include the null characters may be used as the input data. That is, because the server 200 may determine that the word including the null characters is the same word as the word input by the user, the server 200 may estimate the original word by using only the words that do not include the null characters as the input data. For the method of using the artificial intelligence model for word estimation, the technical ideas described in FIGS. 6 to 7B described above may be equally applied.

Figure 10:
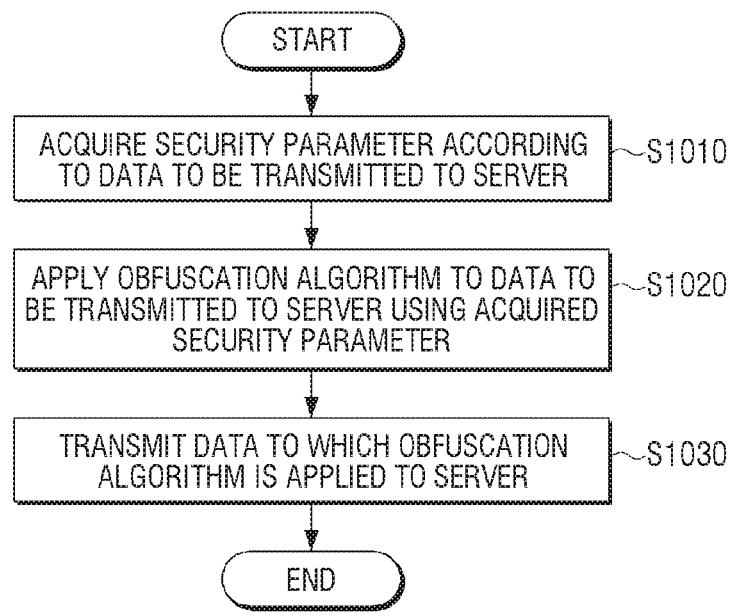
FIG. 10 is a flowchart for describing a method for controlling an electronic device according to an embodiment of the disclosure.

FIG. 10 is a flowchart for describing a method for controlling an electronic device according to an embodiment of the disclosure.

The electronic device 100 may transmit data to the server 200. At this time, the electronic device 100 may acquire a security parameter according to the data transmitted to the server 200 (S1010). As described above, the security parameter may be acquired according to the importance of data, and further, may be acquired by further considering the importance of an application in which the data is generated.

The electronic device 100 may apply an obfuscation algorithm to the data to be transmitted to the server 200 using the acquired security parameter (S1020). The electronic device 100 may transmit the data to which the obfuscation algorithm is applied to the server 200 (S1030).

Figure 11:
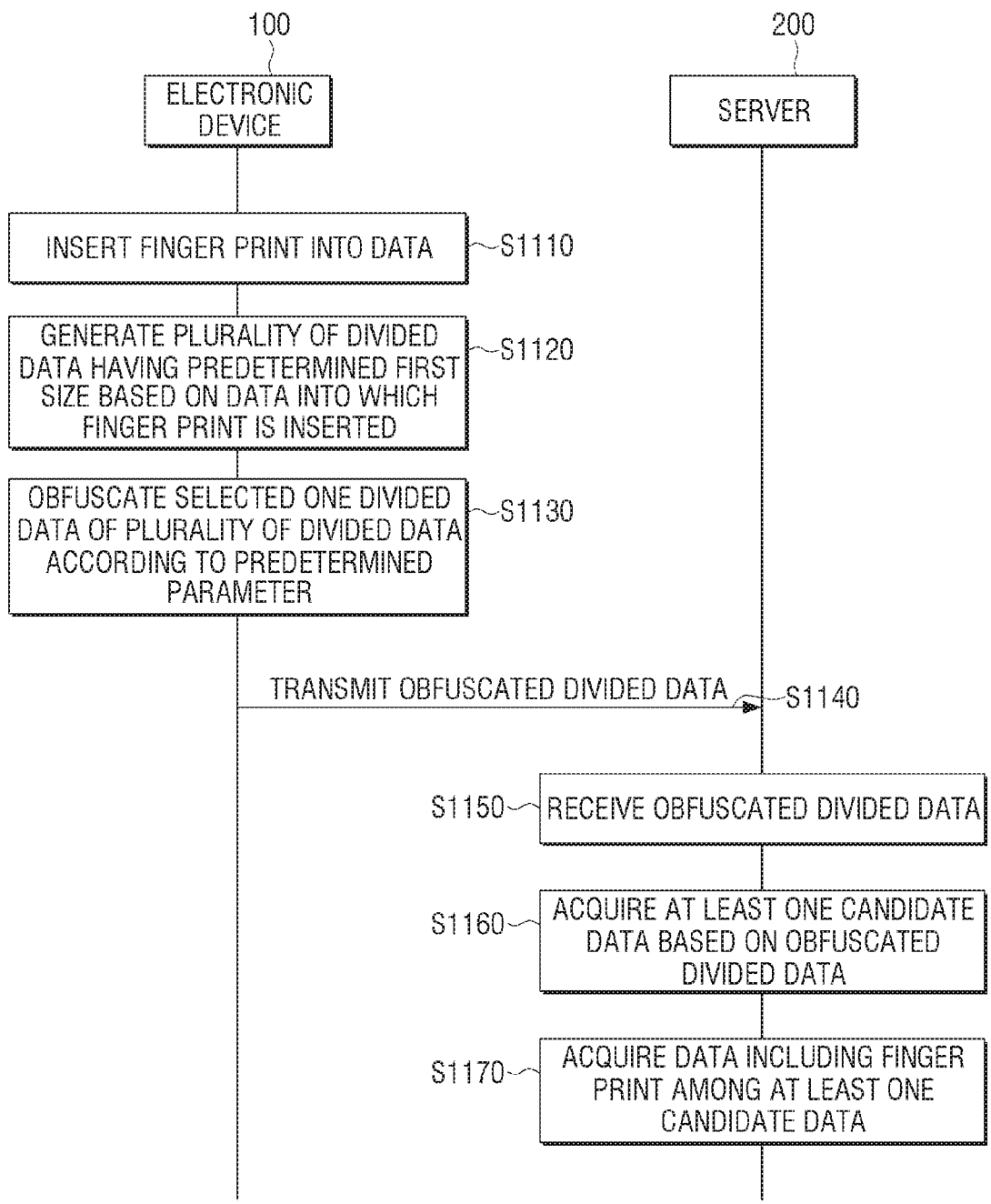
FIG. 11 is a sequence diagram for describing a method for obfuscating and decoding data according to an embodiment of the disclosure.

FIG. 11 is a sequence diagram for describing a method for obfuscating and decoding data according to an embodiment of the disclosure.

First, the electronic device 100 may insert a finger print into data to be obfuscated (S1110). As described above, the data to be obfuscated may be data padded or truncated to a predetermined second size, and the finger print may be a hash value that the padded or truncated data is applied to the hash function as an input value.

The electronic device 100 may generate a plurality of divided data having a predetermined first size based on the data into which the finger print is inserted (S1120). As described above, the divided data may be cyclic-duplicate data. That is, each adjacent data may have duplicate data having a predetermined third size, and a first divided data and the last divided data may also have the duplicate data having the predetermined third size.

The electronic device 100 may obfuscate selected one of the plurality of divided data according to a predetermined security parameter (S1130). At this time, each of the plurality of divided data may include an index, and the obfuscated data may include index information.

The electronic device 100 may transmit the obfuscated divided data to the server 200 (S1140).

The server 200 may receive the obfuscated divided data (S1150). Specifically, the server 200 may receive a plurality of obfuscated data from the plurality of electronic devices.

The server 200 may acquire at least one candidate data based on the obfuscated divided data (S1160). Specifically, the server 200 may sort the received data for each index, select data of which the same data is a predetermined number (or size, capacity, etc.) or more among the data sorted for each index, and acquire at least one candidate data by connecting the selected data. As described above, when the selected data is connected, the duplicate data having the predetermined third size may be used.

The server 200 may acquire data including a finger print among at least one candidate data (S1170). Specifically, the server 200 may separate the data at a position where the finger print is inserted from the candidate data, and determine whether or not a hash value that the separated data is applied to the hash function as an input value and the data at the position where the finger print is inserted are the same. If the hash value that the separated data is applied to the hash function as the input value and the data at the position where the finger print is inserted are the same, the server 200 may determine that the candidate data is the same as the data received from the electronic device. If the hash value that the separated data is applied to the hash function as the input value and the data at the position where the finger print is inserted are not the same, the server 200 may not select the corresponding candidate data.

The term "~ or" used in the disclosure includes a unit composed of hardware, software, or firmware, and may be used interchangeably with the term such as logic, logic block, component, or circuit. The module may be an integrally formed component or a minimum unit of performing one or more functions or a portion thereof. For example, the module may be configured as an application-specific integrated circuit (ASIC).

The diverse embodiments of the disclosure may be implemented as software including instructions that are stored in a machine-readable storage medium (e.g., a computer). The machine is an apparatus that calls the stored instructions from the storage medium and is operable according to the called instructions, and may include an electronic device (e.g., an electronic device A) according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. Here, the term 'non-transitory' means that the storage medium does not include a signal and is tangible, but does not distinguish whether data is stored semi-permanently or temporarily in the storage medium.

According to an embodiment, the method according to the diverse embodiments disclosed in the disclosure may be included and provided in a computer program product. The computer program product may be traded as a product between a seller and a purchaser. The computer program product may be distributed in the form of a machine readable storage medium (e.g., a compact disc read only memory (CD-ROM)), or online through an application store (e.g., PlayStore™). In case of the online distribution, at least a portion of the computer program product may be at least temporarily stored or be temporarily generated in a storage medium such as a server of a manufacturer, a server of an application store, or a memory of a relay server.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component according to the diverse embodiments may be performed in a sequential, parallel, iterative, or heuristic manner, or at least some operations may be executed in a different order or omitted, or other operations may be added.

The methods described above are implemented in the form of program instructions that may be executed through various computer means and may be recorded on a computer-readable medium. The computer-readable medium may include program instructions, data files, data structures, or the like alone or in combination. The program instructions recorded on the medium may be specially designed and configured for the disclosure, or may be known and available to those skilled in computer software. Examples of the computer-readable recording medium may include a magnetic medium such as a hard disk, a floppy disk, and a magnetic tape; an optical medium such as a compact disk read only memory (CD-ROM) or a digital versatile disk (DVD); a magneto-optical medium such as a floptical disk; and a hardware device specially configured to store and execute program instructions, such as a ROM, a random access memory (RAM), a flash memory, or the like. Examples of the program instructions include a high-level language code capable of being executed by a computer using an interpreter, or the like, as well as a machine language code produced by a compiler. The hardware device may be configured to operate as one or more software modules to perform the operation of the disclosure, and vice versa.

As described above, although the disclosure has been described with limited embodiments and drawings, the disclosure is not limited to the above-described embodiments, and various modifications and variations may be made from these descriptions by those skilled in the art to which the disclosure pertains. Therefore, the scope of the disclosure should not be limited to the described embodiments, and should be defined not only by the following claims, but also by the claims and equivalents.

What is claimed is:

1. A control method of an electronic device for obfuscating user data, the control method comprising:
    generating, by an application executed by the electronic device, data to be transmitted to an external server;
    acquiring a security parameter corresponding to a degree of security for the data by applying information regarding the application as input data to an artificial intelligence (AI) learning model;
    applying an obfuscation algorithm to the data using the security parameter; and
    transmitting the data to which the obfuscation algorithm is applied to the external server.

2. The control method as claimed in claim 1, wherein the application information comprises at least one of a category of the application, a name of the application, data generated by the application, or a source code for driving the application.

3. The control method as claimed in claim 1, wherein the applying of the obfuscation algorithm includes:
    inserting a fingerprint into the data;
    generating a plurality of divided data having a first size based on the data into which the fingerprint is inserted; and
    applying the obfuscation algorithm to a selected one of the plurality of divided data using the security parameter,
    wherein, in the transmitting of the data, the selected one divided data to which the obfuscation algorithm is applied is transmitted.

4. The control method as claimed in claim 3, wherein, in the inserting of the fingerprint,
    the data is padded according to a second size based on the data having a size smaller than the second size, and the fingerprint is inserted into the padded data, and
    the data is truncated according to the second size based on the data having a size larger than the second size, and the fingerprint is inserted into the truncated data.

5. The control method as claimed in claim 4, wherein
    the plurality of divided data comprises first through N-th divided data,
    the generating of the divided data further includes inserting an index from 0 to N−1 respectively into each of the first through N-th divided data, and
    divided data adjacent to each other among the plurality of divided data include duplicate data having a third size.

6. The control method as claimed in claim 5, wherein the N-th divided data and the first divided data include duplicate data having the third size.

7. The control method as claimed in claim 6, wherein the inserting of the fingerprint further includes re-sorting the data into which the fingerprint is inserted using a permutation matrix.

8. An electronic device for obfuscating user data, the electronic device comprising:
    a communicator comprising a communication circuit;
    a memory configured to include at least one instruction; and
    a processor connected to the communicator and the memory and configured to control the electronic device,
    wherein the processor is configured to, by executing the at least one instruction:
        generate, by an application executed by the processor, data to be transmitted to an external server,
        acquire a security parameter corresponding to a degree of security for the data by applying information regarding the application as input data to an artificial intelligence (AI) learning model,
        apply an obfuscation algorithm to the data using the security parameter, and
        control the communicator to transmit the data to which the obfuscation algorithm is applied to the external server.

9. The electronic device as claimed in claim 8, wherein the application information comprises at least one of a category of the application, a name of the application, data generated by the application, or a source code for driving the application.

10. The electronic device as claimed in claim 8, wherein the processor is further configured to, by executing the at least one instruction:
    insert a fingerprint into the data;
    generate a plurality of divided data having a first size based on the data into which the fingerprint is inserted; and
    apply the obfuscation algorithm to a selected one of the plurality of divided data using the security parameter,
    wherein, in the transmitting of the data, the selected one divided data to which the obfuscation algorithm is applied is transmitted.

11. The electronic device as claimed in claim 10, wherein the processor is further configured to, by executing the at least one instruction:
    pad the data according to a second size based on the data having a size smaller than the second size, and insert the fingerprint into the padded data, and
    truncate the data according to the second size based on the data having a size larger than the second size, and insert the fingerprint into the truncated data.

12. The electronic device as claimed in claim 11, wherein the plurality of divided data comprises first through N-th divided data, the generating of the divided data further includes inserting an index from 0 to N−1 respectively into each of the first through N-th divided data, and divided data adjacent to each other among the plurality of divided data include duplicate data having a third size.

13. The electronic device as claimed in claim 12, wherein the N-th divided data and first divided data include duplicate data having the third size, and wherein the processor is further configured to, by executing the at least one instruction:

re-sort the data into which the fingerprint is inserted using a permutation matrix.

14. A control method of a system including an electronic device for obfuscating user data and a server for decoding obfuscated data, wherein the control method of the electronic device includes:

inserting a fingerprint into data;

generating a plurality of divided data having a first size based on the data into which the fingerprint is inserted, wherein the plurality of divided data includes divided data having duplicate data;

applying an obfuscation algorithm to a selected one of the plurality of divided data using a security parameter; and transmitting the divided data to which the obfuscation algorithm is applied to the server.

15. The control method as claimed in claim 14, further comprising:

padding the data according to a second size based on the data having a size smaller than the second size, and inserting the fingerprint into the padded data, and truncating the data according to the second size based on the data having a size larger than the second size, and inserting the fingerprint into the truncated data.

16. The control method as claimed in claim 15, wherein the plurality of divided data comprises first through N-th divided data and the control method further comprises:

inserting an index from 0 to N−1 respectively into each of the first through N-th divided data, wherein divided data adjacent to each other among the plurality of divided data include duplicate data having a third size.

17. The control method as claimed in claim 16, wherein the N-th divided data and the first divided data include duplicate data having the third size.

* * * * *